United States Patent
Harashina et al.

(10) Patent No.: US 7,115,677 B2
(45) Date of Patent: Oct. 3, 2006

(54) FLAME-RETARDANT RESIN COMPOSITION

(75) Inventors: Hatsuhiko Harashina, Fuji (JP); Shinya Yamada, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 10/496,163

(22) PCT Filed: Nov. 28, 2002

(86) PCT No.: PCT/JP02/12404

§ 371 (c)(1),
(2), (4) Date: May 20, 2004

(87) PCT Pub. No.: WO03/046083

PCT Pub. Date: Jun. 5, 2003

(65) Prior Publication Data

US 2004/0266916 A1    Dec. 30, 2004

(30) Foreign Application Priority Data

Nov. 30, 2001  (JP) .............................. 2001-367988

(51) Int. Cl.
*C08K 9/04* (2006.01)
*C08K 9/10* (2006.01)

(52) U.S. Cl. ...................... 523/205; 523/209; 523/216; 523/217; 524/100; 524/101; 524/127; 524/140; 524/141

(58) Field of Classification Search ................ 523/205, 523/209, 216–217; 524/100–101, 127, 140–141, 524/205

See application file for complete search history.

(56) References Cited

U.S. PATENT DOCUMENTS 5,371,123 A * 12/1994 Gallucci et al. .............. 524/94
5,770,644 A * 6/1998 Yamamoto et al. ......... 524/120
6,066,686 A * 5/2000 Katayama et al. .......... 523/423
6,228,912 B1 * 5/2001 Campbell et al. ........... 524/100

FOREIGN PATENT DOCUMENTS

| | | |
|---|---|---|
| DE | 40 24 872 C1 | 2/1992 |
| DE | 196 48 799 A1 | 5/1998 |
| EP | 0 133 641 | 3/1985 |
| EP | 0 146 689 | 7/1985 |
| EP | 0 604 078 A1 | 6/1994 |
| JP | 60-47056 | 3/1985 |
| JP | 10-168295 | 6/1998 |
| JP | 10-168297 | 6/1998 |
| WO | WO 92/11314 | 7/1992 |
| WO | WO 92/16586 A | 10/1992 |
| WO | WO 98/45364 A | 10/1998 |

* cited by examiner

Primary Examiner—Peter Szekely
(74) Attorney, Agent, or Firm—Nixon & Vanderhye PC

(57) ABSTRACT

A flame-retardant resin composition comprises 10 to 300 parts by weight of a flame retardant (B) and 1 to 200 parts by weight of an inorganic filler (C) (a glass fiber and/or a glass flake), relative to 100 parts by weight of a base resin (A). The flame retardant (B) comprises a polyphenylene oxide-series resin and/or a polyphenylene sulfide-series resin (B1), a phosphoric ester (B2), and a nitrogen-containing cyclic compound (B3) (for example, a polyphosphate of an amino group-containing triazine compound). The inorganic filler (C) has been treated with a surface-treatment agent or sizing agent containing a novolak epoxy resin. Such a resin composition is useful for obtaining a shaped article which has been inhibited from dripping and to which flame retardancy is highly imparted.

15 Claims, No Drawings

FLAME-RETARDANT RESIN COMPOSITION

This application is the US national phase of international application PCT/JP02/12404 filed 28 Nov. 2002 which designated the U.S. and claims benefit of JP 367988/2001, dated 30 Nov. 2001, the entire content of which is hereby incorporated by reference.

TECHNICAL FIELD

The present invention relates to a flame-retardant resin composition having an excellent effect on inhibiting dripping, and a shaped article formed with the composition.

BACKGROUND ART

Among thermoplastic resins, a polyester-series resin, has excellent mechanical and electrical properties, weather resistance, water resistance, and resistance to chemicals and solvents. Therefore, the resin is used as an engineering plastic in various purposes such as electric or electronic device parts, mechanical device parts and automotive parts. While, the polyester-series resin is required to have improved mechanical properties and to be flame-retardant from the viewpoint of safety as the field of their uses expands. In general, there is known a method for rendering the polyester-series resin flame-retardant by adding a flame retardant composed of a halogen-containing compound or an antimony-containing compound to the resin. However, the halogen-containing flame retardant is not preferable for environmental reasons because the flame retardant sometimes generates a large amount of a dioxin-series compound on resolution caused by combustion. Therefore, there is proposed a method for rendering the polyester-series resin flame-retardant by using a polycarbonate-series resin and a phosphorus-containing compound as a halogen-free flame retardant.

Japanese Patent Application Laid-Open No. 168297/1998 (JP-10-168297A) discloses a flame-retardant resin composition comprising a thermoplastic polyester resin, a polycarbonate-series resin, an organic phosphorus-series flame retardant, and a stabilized red phosphorus. Moreover, Japanese Patent Application Laid-Open No. 168295/1998 (JP-10-168295A) discloses a flame-retardant resin composition comprising a master batch composed of a polyester resin, a polycarbonate resin, a stabilized red phosphorus, and an olefinic resin.

The halogen-free flame retardant does not comprise harmful halogens, however, it is inferior to a halogen-series flame retardant in flame retardancy, so that it is necessary to add a large amount of the flame-retardant. The addition of a large amount of the flame-retardant brings about bleeding out (blooming) and deterioration in mechanical properties of a resin. Therefore, it is difficult to improve flame retardancy, mechanical properties and formability (or moldability).

On the other hand, there is also known a method for rendering the polyester-series resin flame-retardant by using a polyphenylene oxide resin and a phosphorus-containing compound. For example, Japanese Patent Application Laid-Open No. 47056/1985 (JP-60-47056A) discloses a thermoplastic resin composition in which a thermoplastic linear polyester resin, and a flame-retardant comprising a polyphenylene oxide resin, an organic phosphoric ester and a bromine-containing compound are blended. However, this method is not preferable for environmental reasons because of using a halogen-containing compound.

Therefore, it is contemplated that flame retardancy is imparted to a polyester resin without using a halogen-containing compound. For example, Japanese Patent Application Laid-Open No. 504563/1994 (JP-6-504563A) describes a resin composition comprising a polybutylene terephthalate, a polyphenylene oxide, and a resorcinol diphosphate. However, the resin composition has only approximately V-2 rank based on Flammability test UL-94, and does not have enough flame retardancy. Moreover, burning of the resin composition brings about dripping.

It is therefore an object of the present invention to provide a flame-retardant resin composition in which dripping has been inhibited, and a shaped article formed with the same.

It is another object of the present invention to provide a flame-retardant resin composition to which flame retardancy is imparted at a high level by using a halogen-free flame retardant without deteriorating properties of a base resin, and a shaped article formed with the same.

DISCLOSURE OF THE INVENTION

The inventors of the present invention made intensive studies to achieve the above objects and finally found that use of a specific flame retardant in combination with an inorganic filler treated with a novolak epoxy resin imparts flame retardancy to a base resin, particularly a polyester-series resin, at a high level and inhibits dripping at a high temperature. The present invention was accomplished based on the above finding.

That is, the flame-retardant resin composition of the present invention comprises a base resin (A), a flame retardant (B) and an inorganic filler (C), in which the flame retardant comprises (B1) at least one member selected from the group consisting of a polyphenylene oxide-series resin and a polyphenylene sulfide-series resin, (B2) a phosphoric ester, and (B3) a nitrogen-containing cyclic compound, and the inorganic filler (C) has been treated with a surface-treatment agent or sizing agent containing a novolak epoxy resin. The inorganic filler (C) may comprise at least one member selected from the group consisting of a glass fiber and a glass flake. The amount of the surface-treatment agent or sizing agent may be about 0.01 to 5 parts by weight relative to 100 parts by weight of the inorganic filler. The base resin may include a polyester-series resin, a polyamide-series resin, an olefinic resin, an acrylic resin, a vinyl-series resin, and others. In particular, in the case where the base resin is a polyester-series resin (A), the base resin may comprise a homo- or co-polyester having at least one unit selected from the group consisting of 1,4-cyclohexanedimethylene terephthalate, a $C_{2-4}$ alkylene terephthalate, and a $C_{2-4}$ alkylene naphthalate. The phosphoric ester (B2) may comprise a condensed phosphoric ester, and the nitrogen-containing cyclic compound (B3) may comprise at least one member selected from the group consisting of a polyphosphate of an amino group-containing triazine compound, and a polyphosphoric acid amide. The flame-retardant resin composition may contain about 10 to 300 parts by weight of the flame retardant (B) and about 1 to 200 parts by weight of the inorganic filler (C), relative to 100 parts by weight of the base resin (A). The flame retardant (B) may contain 10 to 500 parts by weight of the component (B1) (the polyphenylene oxide-series resin and the polyphenylene sulfide-series resin) and 0 to 1000 parts by weight of the nitrogen-containing cyclic compound (B3), relative to 100 parts by weight of the phosphoric ester (B2).

The present invention particularly includes a flame-retardant resin composition comprising at least one polyester-series resin (A) selected from the group consisting of a polybutylene terephthalate, a copolyester containing a butylene terephthalate as a main unit thereof, a polyethylene terephthalate, and a copolyester containing an ethylene terephthalate as a main unit thereof; a flame retardant (B); and a glass fiber (C); in which the flame retardant (B) comprises the following components (B1), (B2), and (B3):

(B1) at least one member selected from the group consisting of a polyphenylene oxide-series resin and a polyphenylene sulfide-series resin, (B2) a condensed phosphoric ester, and (B3) a salt of a polyphosphoric acid having a condensation degree of 3 to 200 with at least one member selected from the group consisting of melamine and a melamine condensate; and the surface of the glass fiber (C) has been treated with 0.05 to 3 parts by weight of a surface-treatment agent or sizing agent containing a novolak epoxy resin relative to 100 parts by weight of the glass fiber.

The flame-retardant resin composition may further comprise a styrenic resin (D). Moreover, the flame-retardant resin composition may comprise at least one flame-retardant auxiliary (or flame-retardant synergist) selected from the group consisting of a resinous flame-retardant auxiliary (aromatic resin) (E1), and an inorganic flame-retardant auxiliary (E2). As the resinous flame-retardant auxiliary (E1), there may be used at least one aromatic resin selected from the group consisting of a resin of which the main chain or side chain contains an aromatic ring having at least one group selected from a hydroxyl group and an amino group; a polyarylate-series resin; an aromatic epoxy resin; and a polycarbonate-series resin. As the inorganic flame-retardant auxiliary (E2), there may be used at least one member selected from the group consisting of a metal borate, a metal hydrogenphosphate, a metal oxide, a metal hydroxide, a metal sulfide, and a red phosphorus.

Moreover, the flame-retardant resin composition may comprise a hindered phenol-series antioxidant, a phosphorus-containing stabilizer, an inorganic stabilizer, and a compound having a functional group reactive to an active hydrogen atom (reactive stabilizer), and a fluorine-containing resin.

The present invention also includes a shaped article formed with the flame-retardant resin composition. The shaped article is useful for an electric or electronic device part, an office automation (OA) device part, a household electrical appliance part, an automotive part, or a mechanical part or machine element.

BEST MODE FOR CARRYING OUT THE INVENTION

[Base Resin]

The base resin is not particularly limited to a specific one, and includes various thermoplastic resins, thermosetting resins, or others. As the thermoplastic resin constituting the base resin, there may be preferably used a polyester-series resin, a polyamide-series resin, an olefinic resin, an acrylic resin, a vinyl-series resin, and others.

(Polyester-Series Resin)

The polyester-series resin is a homopolyester or copolyester obtained by, for example, a polycondensation of a dicarboxylic acid component and a diol component, a polycondensation of a hydroxycarboxylic acid or a lactone, or a polycondensation of these components. The preferred polyester-series resin usually includes a saturated polyester-series resin, in particular an aromatic saturated polyester-series resin.

The dicarboxylic acid component includes, for example, an aromatic dicarboxylic acid [e.g., a dicarboxylic acid having about 8 to 16 carbon atoms such as phthalic acid, isophthalic acid, terephthalic acid, a naphthalenedicarboxylic acid (such as 2,6-naphthalenedicarboxylic acid), 4,4'-diphenyldicarboxylic acid, 4,4'-diphenoxyetherdicarboxylic acid, bis(4-carboxyphenyl)ether, 4,4'-diphenylmethanedicarboxylic acid, and 4,4'-diphenylketonedicarboxylic acid]. Moreover, the dicarboxylic acid component may be used in combination with an aliphatic dicarboxylic acid (e.g., a dicarboxylic acid having about 4 to 40 carbon atoms such as succinic acid, glutaric acid, adipic acid, pimelic acid, suberic acid, azelaic acid, sebacic acid, undecanedicarboxylic acid, dodecanedicarboxylic acid, hexadecanedicarboxylic acid and dimeric acid, preferably a dicarboxylic acid having about 4 to 14 carbon atoms), an alicyclic dicarboxylic acid (e.g., a dicarboxylic acid having about 8 to 12 carbon atoms such as hexahydrophthalic acid, hexahydroisophthalic acid, hexahydroterephthalic acid, and himic acid), or a derivative thereof (e.g., an ester-formable derivative such as a lower alkyl ester, an aryl ester, and an acid anhydride). These dicarboxylic acid components may be used singly or in combination. Further, if necessary, the dicarboxylic acid component may be used in combination with a polyfunctional carboxylic acid such as trimellitic acid and pyromellitic acid.

The preferred dicarboxylic acid component includes an aromatic dicarboxylic acid such as terephthalic acid, isophthalic acid, and naphthalenedicarboxylic acid.

As the diol component, for example, there are mentioned an aliphatic alkylene glycol (e.g., an aliphatic glycol having about 2 to 12 carbon atoms such as ethylene glycol, trimethylene glycol, propylene glycol, 1,4-butanediol, 1,3-butanediol, neopentyl glycol, hexanediol, octanediol and decanediol, preferably an aliphatic glycol having about 2 to 10 carbon atoms), a polyoxyalkylene glycol [e.g., a glycol having a plurality of oxyalkylene units of which the alkylene group has about 2 to 4 carbon atoms, for example, diethylene glycol, dipropylene glycol, ditetramethylene glycol, triethylene glycol, tripropylene glycol, a polytetramethylene glycol], an alicyclic diol (e.g., 1,4-cyclohexanediol, 1,4-cyclohexanedimethanol, hydrogenated bisphenol A), and others. Moreover, the diol component may be used in combination with an aromatic diol such as hydroquinone, resorcinol, biphenol, 2,2-bis(4-hydroxyphenyl)propane, 2,2-bis-(4-(2-hydroxyethoxy)phenyl)propane, and xylylene glycol. These diol components may be used singly or in combination. Further, if necessary, the diol component may be used in combination with a polyol such as glycerin, trimethylolpropane, trimethylolethane and pentaerythritol.

The preferred diol component includes a $C_{2-6}$ alkylene glycol (e.g., a linear alkylene glycol such as ethylene glycol, trimethylene glycol, propylene glycol and 1,4-butanediol), a polyoxyalkylene glycol having a repeating oxyalkylene unit of about 2 to 4 [a glycol containing a poly(oxy-$C_{2-4}$alkylene) unit, such as diethylene glycol and a polytetramethylene glycol], and 1,4-cyclohexanedimethanol.

The hydroxycarboxylic acid includes, for example, a hydroxycarboxylic acid such as hydroxybenzoic acid, hydroxynaphthoic acid, hydroxyphenylacetic acid, glycolic acid and hydroxycaproic acid, or a derivative thereof.

Exemplified as the lactone is a $C_{3-12}$ actone such as propiolactone, butyrolactone, valerolactone, and caprolactone (e.g., ε-caprolactone), and others.

The preferred polyester-series resin includes a homopolyester or copolyester containing an alkylene arylate unit (such as an alkylene terephthalate and an alkylene naphthalate) as a main unit (e.g., about 50 to 100% by weight, preferably about 75 to 100% by weight) [for example, a homopolyester such as a polyalkylene terephthalate (e.g., a poly$C_{2-4}$alkylene terephthalate such as poly(1,4-cyclohexanedimethyleneterephthalate) (PCT), a polyethylene terephthalate (PET), a polypropylene terephthalate (PPT) and a polybutylene terephthalate (PBT)), a polyalkylene naphthalate (e.g., a poly$C_{2-4}$ alkylene naphthalate such as a polyethylene naphthalate and a polybutylene naphthalate); and a copolyester containing alkylene terephthalate and/or alkylene naphthalate unit(s) as a main unit (e.g., not less than 50% by weight)]. The particularly preferred polyester-series resin includes a polybutylene terephthalate-series resin containing a butylene terephthalate unit as a main unit (e.g., a polybutylene terephthalate, and a polybutylene terephthalate copolyester), a polyethylene terephthalate-series resin containing an ethylene terephthalate unit as a main unit (e.g., a polyethylene terephthalate, and a polyethylene terephthalate copolyester). Incidentally, these polyester-series resins may be used singly or in combination.

Moreover, in the copolyester, a copolymerizable monomer includes a $C_{2-6}$alkylene glycol (e.g., a linear alkylene glycol such as ethylene glycol, propylene glycol and 1,4-butanediol), a polyoxyalkylene glycol which has a repeating oxyalkylene unit of about 2 to 4 (e.g., a glycol comprising a poly(oxy-$C_{2-4}$alkylene) unit, such as diethylene glycol and a polytetramethylene glycol), a $C_{6-12}$ aliphatic dicarboxylic acid (e.g., adipic acid, pimelic acid, suberic acid, azelaic acid, sebacic acid), an aromatic dicarboxylic acid (e.g., phthalic acid, isophthalic acid, a diphenyldicarboxylic acid), a hydroxycarboxylic acid (e.g., hydroxybenzoic acid, hydroxynaphthoic acid), and others. Incidentally, the polyester-series resin may have not only a linear chain structure but also a branched chain structure, or crosslinked structure as far as melt-moldability thereof is not deteriorated. Moreover, the polyester-series resin may be a liquid crystalline polyester. Such a polyester-series resin may be used singly or in combination.

The polyester-series resin may be produced by a conventional manner, for example, transesterification, direct esterification.

The number average molecular weight of the polyester-series resin is, for example, about $5 \times 10^3$ to $100 \times 10^4$, preferably about $1 \times 10^4$ to $70 \times 10^4$, and more preferably about $1.2 \times 10^4$ to $30 \times 10^4$.

(Polyamide-Series Resin)

The polyamide-series resin includes a polyamide derived from a diamine and a dicarboxylic acid; a polyamide obtained from an aminocarboxylic acid, and if necessary in combination with a diamine and/or a dicarboxylic acid; a polyamide derived from a lactam, and if necessary in combination with a diamine and/or a dicarboxylic acid. The polyamide-series resin also includes a copolyamide derived from at least two different kinds of polyamide constituent components.

As the diamine, there may be mentioned, for example, an aliphatic diamine such as trimethylenediamine, tetramethylenediamine, pentamethylenediamine, hexamethylenediamine, 2,2,4-trimethylhexamethylenediamine, 2,4,4-trimethylhexamethylenediamine, octamethylenediamine and nonamethylenediamine; and an alicyclic diamine such as bis(4-aminocyclohexyl)methane and bis(4-amino-3-methylcyclohexyl)methane. Moreover, the diamine may be used in combination with an aromatic diamine such as phenylenediamine and metaxylylenediamine. These diamines may be used singly or in combination.

Examples of the dicarboxylic acid are a $C_{4-20}$ aliphatic dicarboxylic acid such as glutaric acid, adipic acid, pimelic acid, suberic acid, azelaic acid, sebacic acid and octadecanoic diacid; a dimerized fatty acid (dimeric acid); an alicyclic dicarboxylic acid such as cyclohexane-1,4-dicarboxylic acid and cyclohexane-1,3-dicarboxylic acid; an aromatic dicarboxylic acid such as phthalic acid, phthalic anhydride, isophthalic acid, terephthalic acid and naphthalenedicarboxylic acid; and others.

As the aminocarboxylic acid, there may be mentioned, for example, a $C_{4-20}$aminocarboxylic acid such as aminoheptanoic acid, aminononanoic acid and aminoundecanoic acid. These aminocarboxylic acids may be also used singly or in combination.

As the lactam, for example, there may be mentioned a $C_{4-20}$lactam such as butyrolactam, pivalolactam, caprolactam, caprilactam, enantholactam, undecanolactam and dodecalactam. These lactams may be also used singly or in combination.

The polyamide-series resin includes an aliphatic polyamide (such as a nylon 46, a nylon 6, a nylon 66, a nylon 610, a nylon 612, a nylon 11 and a nylon 12), a polyamide obtainable from an aromatic dicarboxylic acid (e.g., terephthalic acid and/or isophthalic acid) and an aliphatic diamine (e.g., hexamethylenediamine, nonamethylenediamine), a polyamide obtainable from both aromatic and aliphatic dicarboxylic acids (e.g., both terephthalic acid and adipic acid), and an aliphatic diamine (e.g., hexamethylenediamine), and others. These polyamides may be used singly or in combination. The preferred polyamide includes a nonaromatic and aliphatic polyamide (e.g., a nylon 6, a nylon 66, a nylon 610, a nylon 612, a nylon 11, a nylon 12), a semiaromatic polyamide (e.g., a nylon MXD6, a nylon 9T), a copolymerized semiaromatic polyamide (e.g., a nylon 6T/6, a nylon 6T/66, a nylon 6T/12, a nylon 6I/6, a nylon 6I/66, a nylon 6T/6I, a nylon 6T/6I/6, a nylon 6T/6I/66, a nylon 6T/M5T), and others. These polyamide-series resins may be used singly or in combination.

(Olefinic Resin)

As the olefinic resin, for example, there may be mentioned a homo- or copolymer of an α-olefin such as ethylene, propylene, and 1-butene (in particular an α-$C_{2-10}$olefin). The preferred olefinic resin includes a polyethylene, a polypropylene, an ethylene-propylene copolymer, and others.

(Acrylic Resin)

The acrylic resin includes a homo- or copolymer of a (meth)acrylic monomer [e.g., (meth)acrylic acid, methyl (meth)acrylate, (meth)acrylamide, and (meth)acrylonitrile], or a copolymer of a (meth)acrylic monomer and other copolymerizable monomer.

(Vinyl-Series Resin)

The vinyl-series resin includes a homo- or copolymer of a vinyl-series monomer [e.g., a vinyl ester such as vinyl acetate, vinyl propionate, vinyl crotonate and vinyl benzoate; a chlorine-containing vinyl monomer (e.g., vinyl chloride, chloroprene); a fluorine-containing vinyl monomer (e.g., fluoroethylene); a vinyl ketone such as methyl vinyl ketone and methyl isopropenyl ketone; a vinyl ether such as vinyl methyl ether and vinyl isobutyl ether; and a vinyl amine such as N-vinylcarbazole and N-vinylpyrrolidone], or a copolymer of a vinyl-series monomer and other copolymerizable monomer.

A derivative of the above-mentioned vinyl-series resin (e.g., a polyvinyl alcohol, a polyvinyl acetal such as a polyvinyl formal and a polyvinyl butyral, an ethylene-vinyl acetate copolymer, an ethylene-vinyl alcohol copolymer) may be also used.

The number average molecular weight of the thermoplastic resin is not particularly limited to a specific one, and is suitably selected depending on a kind or application of resin. For example, the number average molecular weight may be selected within the range of about $5 \times 10^3$ to $200 \times 10^4$, preferably about $1 \times 10^4$ to $150 \times 10^4$, and more preferably about $1 \times 10^4$ to $100 \times 10^4$. Moreover, in the case where the thermoplastic resin is a polyester-series resin, the number average molecular weight may for example be about $5 \times 10^3$ to $100 \times 10^4$, preferably about $1 \times 10^4$ to $70 \times 10^4$, and more preferably about $1.2 \times 10^4$ to $30 \times 10^4$.

The above-mentioned thermoplastic resins may be used singly or in combination.

The preferred thermoplastic resin includes a polyester-series resin which may be a liquid crystal polyester, a polyamide-series resin, a vinyl-series resin, or others, and particularly includes a polyester-series resin (e.g., a PBT-series resin, a PET-series resin).

[Flame Retardant (B)]

According to the present invention, the flame retardant (B) comprising a polyphenylene oxide-series resin and/or polyphenylene sulfide-series resin (B1), a phosphoric ester (B2), and a nitrogen-containing cyclic compound (B3) imparts high flame retardancy to the base resin without deteriorating properties of the base resin.

(B1) Polyphenylene oxide-series resin, polyphenylene sulfide-series resin

The polyphenylene oxide-series resin (polyphenylene ether-series resin) includes a homopolymer and a copolymer. As the homopolymer, there may be mentioned a poly (mono-, di- or tri$C_{1-6}$alkyl-phenylene) oxide such as a poly(2,6-dimethyl-1,4-phenylene) oxide, a poly(2,5-dimethyl-1,4-phenylene) oxide, a poly(2,5-diethyl-1,4-phenylene) oxide, a poly(2-methyl-6-ethyl-1,4-phenylene) oxide, a poly(2,6-di-n-propyl-1,4-phenylene)oxide, a poly (2-ethyl-6-isopropyl-1,4-phenylene)oxide, a poly(2-methyl-6-methoxy-1,4-phenylene)oxide, a poly(2-methyl-6-hydroxyethyl-1,4-phenylene)oxide, a poly(2,3,6-trimethyl-1, 4-phenylene) oxide, a poly(2,6-diphenyl-1,4-phenylene) oxide, and a poly(2-methyl-6-phenyl-1,4-phenylene)oxide; a poly(mono- or di$C_{6-20}$aryl-phenylene)oxide; and a poly (mono$C_{1-6}$alkyl-mono$C_{6-20}$aryl-phenylene)oxide.

As the copolymer of a polyphenylene oxide, there may be mentioned: a copolymer having not less than two monomer units constituting the above-mentioned homopolymers (e.g., a random copolymer having 2,6-dimethyl-1,4-phenylene oxide unit and 2,3,6-trimethyl-1,4-phenylene oxide unit); a modified polyphenylene oxide copolymer comprising an alkylphenol-modified benzene formaldehyde resin block which is obtainable by a reaction of an alkylphenol (such as cresol and p-tert-butylphenol) with a benzene formaldehyde resin (a condensation product of a benzene ring-containing compound and formaldehyde, such as a phenol resin) or alkylbenzene formaldehyde resin, and a polyphenylene oxide block as the main structure; a modified graft copolymer in which a styrenic polymer is grafted to a polyphenylene oxide or a copolymer thereof; and others.

These polyphenylene oxide-series resins may be used singly or in combination.

The polyphenylene sulfide-series resin (polyphenylene thioether-series resin) includes a homopolymer or copolymer having a polyphenylene sulfide backbone, —(Ar—S—)— (wherein Ar represents a phenylene group). As the phenylene group (—Ar—), there may be mentioned, for example, p-phenylene group, m-phenylene group, o-phenylene group-, a substituted phenylene group (e.g., an alkylphenylene group having substituent(s) such as a $C_{1-5}$alkyl group, an arylphenylene group having substituent(s) such as phenyl group), p,p'-diphenylenesulfone group, p,p'-biphenylene group, p,p'-diphenylene ether group, and p,p'-diphenylenecarbonyl group. The polyphenylene sulfide-series resin may be a homopolymer obtained from a homogeneous repeating unit among the phenylene sulfide groups comprising such a phenylene group, or in view of workability of the composition, the polyphenylene sulfide-series resin may be a copolymer containing a heterogeneous repeating unit among the phenylene sulfide groups comprising such a phenylene group.

As the homopolymer, a substantially linear polymer comprising p-phenylene sulfide group as a repeating unit is preferably used. The copolymer may be obtained from two or more different kinds of phenylene sulfide groups among the phenylene sulfide groups. Among them, a copolymer comprising p-phenylene sulfide group as a main repeating unit in combination with m-phenylene sulfide group is preferred as the copolymer. From the viewpoint of physical properties such as heat resistance, moldability, and mechanical property, a substantially linear copolymer comprising not less than 60 mol % (preferably 70 mol %) of p-phenylene sulfide group is particularly preferred.

The polyphenylene sulfide-series resin may be a polymer obtained by allowing a relatively low molecular weight of a linear polymer to crosslink with oxidation or heating for increasing the melt viscosity of the polymer thereby improving molding processability (mold-processability), or a high molecular weight polymer having a substantially linear structure which polymer is obtained by condensation polymerization from a monomer mainly comprising a bifunctional monomer. From the viewpoint of physical properties of the resultant shaped article, a polymer having a substantially linear structure, which is obtained by condensation polymerization, is more preferred. Moreover, as the polyphenylene sulfide resin, in addition to the above-mentioned polymer, a branched or crosslinked polyphenylene sulfide resin obtained by a polymerization of the monomer in combination with a monomer having not less than three of functional groups, or a resin composition obtained by blending the resin to the above-mentioned linear polymer may be also used.

As the polyphenylene sulfide-series resin, there may be used a polyphenylene sulfide (e.g., a poly-1,4-phenylene sulfide) or a polybiphenylene sulfide (PBPS), in addition a polyphenylene sulfide ketone (PPSK), a polybiphenylene sulfide sulfone (PPSS), or others. The polyphenylene sulfide-series resin may be used singly or in combination.

These polyphenylene oxide-series resins and these polyphenylene sulfide-series resins may be used singly or in combination.

(B2) Phosphoric Ester

The phosphoric ester includes a monomeric phosphoric ester (a phosphoric ester, a phosphorous ester, a hypophosphorous ester), a polymeric phosphoric ester, and others.

As the phosphoric ester, there may be mentioned an aliphatic phosphoric ester [for example, a $triC_{1-10}alkyl$ phosphate such as trimethyl phosphate, triethyl phosphate, tripropyl phosphate, triisopropyl phosphate, tributyl phosphate, triisobutyl phosphate, and pentaerythritol phosphate [e.g., NH-1197 (manufactured by Great Lakes Chemical Corporation), a bicyclophosphoric ester described in Japanese Patent Application Laid-Open No. 106889/2001 (JP-2001-106889A)]; a $diC_{1-10}alkyl$ phosphate and $monoC_{1-10}alkyl$ phosphate corresponding to the above-mentioned phosphoric triester], an aromatic phosphoric ester [for example, a $triC_{6-20}aryl$ phosphate such as triphenyl phosphate, tricresyl phosphate, trixylyl phosphate, diphenyl cresyl phosphate, tri(isopropylphenyl)phosphate and diphenyl ethylcresyl phosphate], an aliphatic-aromatic phosphoric ester [e.g., methyl diphenyl phosphate, phenyl diethyl phosphate, a polyphenol (a cyclic alkylene glycol phosphate) [e.g., resorcinol bis(neopentylene glycol phosphate), hydroquinone bis(neopentylene glycol phosphate), biphenol bis(neopentylene glycol phosphate), bisphenol-A bis(neopentylene glycol phosphate)], a spiro ring-containing aromatic phosphoric ester (e.g., diphenyl pentaerythritol diphosphate, dicresyl pentaerythritol diphosphate, dixylyl pentaerythritol diphosphate)], and others.

The phosphite (or phosphorous ester) includes a variety of phosphorous esters, for example, an aromatic phosphorous ester (e.g., a $triC_{6-20}aryl$ phosphate in which aryl groups are phenyl, cresyl, xylyl group, or other group), an aliphatic phosphorous ester (e.g., a $triC_{1-10}alkyl$ phosphite in which alkyl groups are methyl, ethyl, propyl, isopropyl, butyl, isobutyl, or other groups; a di- or $monoC_{1-10}alkyl$ phosphate corresponding to the above-mentioned trialkyl phosphate), an organic phosphorous ester [for example, a $diC_{1-6}alkyl$ ester of a $C_{1-6}$ alkylphosphorous acid (an ester of a spiro ring-containing alkylphosphorous acid such as pentaerythritol bis(methylphosphonate), pentaerythritol bis(ethylphosphonate), pentaerythritol bis(propylphosphonate), and pentaerythritol bis(butylphosphonate)); a diester of an alkylphosphorous acid such as a $diC_{6-10}aryl$ ester of a $C_{1-6}alkylphosphorous$ acid and a $C_{1-6}alkylC_{6-10}aryl$ ester of a $C_{1-6}alkylphosphorous$ acid, of which the alkyl group is the above-exemplified alkyl group; a diester of $C_{6-10}aryl$-phosphorous acid corresponding to the above-mentioned diester of an alkylphosphorous acid (e.g., an ester of a spiro ring-containig arylphosphorous acid such as pentaerythritoi bis(phenylphosphonate) and pentaerythritol bis(tolylphosphonate)); a $C_{6-10}arylphosphorous$ monoester (e.g., 10-hydroxy-9,10-dihydro-9-oxa-10-phosphaphenanthrene-10-oxide); a phosphonocarboxylate (a phosphonocarboxylic triester such as a $C_{1-4}$ alkoxycarbonyloxy$C_{1-4}$alkylphosphorous diester corresponding to the above-mentioned alkylphosphorous diester, e.g., dimethyl methoxycarbonylmethylphosphonate)]. Moreover, the phosphite (phosphorous ester) also includes a metal salt (for example, a Ca, Mg, Zn, Ba, or Al salt) of a (cyclic) phosphorous monoester, or phosphonocarboxylic acid, each of which may have substituent(s) such as an alkyl group or an aryl group (e.g., a monoalkyl alkylphosphite, a monoaryl alkylphosphite, a monoalkyl arylphosphite, a monoaryl arylphosphite). For example, the details about representative compounds of such a metal salt of an organic phosphorous ester may be referred to Japanese Patent Application Laid-Open No. 22866/1988 (JP-63-22866A), Japanese Patent Application Laid-Open No. 226891/1989 (JP-1-226891A), Japanese Patent Application Laid-Open No. 234893/1992 (JP-4-234893A), Japanese Patent Application Laid-Open No. 245659/1996 (JP-8-245659A), and Japanese Patent Application Laid-Open No. 272759/1997 (JP-9-272759A).

The hypophosphite (hypophosphorous ester) includes a hypophosphorous ester which may be substituted (mono- or disubstituted) with an alkyl group(s) such as a $C_{1-4}alkyl$ group or an aryl group(s) such as a $C_{6-10}aryl$ group (e.g., a $C_{1-6}alkyl$ hypophosphite such as methyl hypophosphite, a $C_{6-10}aryl$ hypophosphite such as phenyl hypophosphite, and a cyclic hypophosphorous ester such as 9,10-dihydro-9-oxa-10-phosphaphenanthrene-10-oxide and a 10-$C_{1-30}alkyl$ or $C_{6-20}aryl$-substituted-9,10-dihydro-9-oxa-10-phosphaphenanthrene-10-oxide). Moreover, the hypophosphite also includes an ester of a phosphinicocarboxylic acid which may have a substituent such as an alkyl group or an aryl group (e.g., an ester of 3-methylphosphinicopropionic acid, an ester of 3-phenylphosphinicopropionic acid), and a homo- or copolymer thereof.

As the polymeric phosphoric ester (or phosphate), there may be used a condensed phosphate. The condensed phosphate includes a condensed phosphate having an aromatic ring, and may for example have a structural unit represented by the following formula (1):

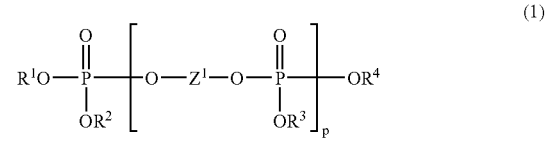

wherein $R^1$ to $R^4$ represent an aryl group which may have a substituent, $Z^1$ represents a bifunctional aromatic group, and "p" denotes an integer of not less than 1.

In the formula (1), the aryl groups represented by the $R^1$ to $R^4$ include a $C_{6-20}aryl$ group (e.g., phenyl group, and naphthyl group), and the substituent of the aryl group includes an alkyl group such as methyl group and ethyl group. Moreover, the bifunctional aromatic group includes an arylene group (e.g., a $C_{6-20}arylene$ group such as phenylene group and naphthylene group), a biphenylene group and a bisphenol residue (e.g., a bisphenol A residue, a bisphenol D residue, and a bisphenol AD residue), and others. The number "p" denotes an integer of not less than 1, preferably an integer of 1 to 100, and particularly preferably an integer of 1 to 30.

The condensate represented by the formula (1) includes, for example, a resorcinol phosphate [e.g., resorcinol bis(diphenyl phosphate), resorcinol bis(dicresyl phosphate), resorcinol bis(dixylyl phosphate)], a hydroquinone phosphate [e.g., hydroquinone bis(diphenyl phosphate), hydroquinone bis(dicresyl phosphate), and hydroquinone bis(dixylyl phosphate)], a biphenol phosphate [e.g., biphenol bis(diphenyl phosphate), biphenol bis(dicresyl phosphate), and biphenol bis(dixylyl phosphate)], a bisphenol phosphate [e.g., bisphenol-A bis(diphenyl phosphate), bisphenol-A bis(dicresyl phosphate), and bisphenol-A bis(dixylyl phosphate)], and others.

Moreover, the polymeric phosphoric ester may be a phosphoric ester of a polymer having a hydroxyl group (such as a phenolic resin). Such a phosphoric ester of a polymer includes, for example, a polymer having a structural unit represented by the following formula (2):

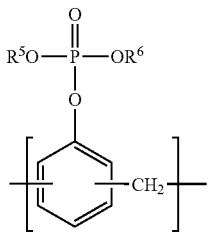

(2)

wherein R⁵ and R⁶ represent an aryl group.

The aryl group includes the above-exemplified aryl group (a $C_{6-20}$aryl group, in particular phenyl group) and a substituted aryl group (an alkyl-substituted aryl group).

Moreover, the phosphoric ester also includes a nitrogen-containing phosphoric ester having a partial structure of the phosphoric ester [for example, a phosphazene (a chain and/or cyclic phenoxyphosphazene; an aryloxyphosphazene modified with a polyhydric phenol (a polyhydroxyphenol such as hydroquinone, resorcinol, and phloroglucin; a biphenol, and a bisphenol (e.g., bisphenol A)), e.g., phenoxyphosphazene, tolyloxyphosphazene, and tolyloxyphenoxyphosphazene; and a phosphoric ester amide (e.g., compounds described in Japanese Patent Application Laid-Open No. 226547/2002 (JP-2002-226547A), Japanese Patent Application Laid-Open No. 354684/2001 (JP-2001-354684A), Japanese Patent Application Laid-Open No. 327834/2000 (JP-2000-327834A), Japanese Patent Application Laid-Open No. 139823/2001 (JP-2001-139823A), Japanese Patent Application Laid-Open No. 154277/2000 (JP-2000-154277A), Japanese Patent Application Laid-Open No. 175985/1998 (JP-10-175985A), Japanese Patent Application Laid-Open No. 59888/1996 (JP-8-59888A), Japanese Patent Application Laid-Open No. 2353/1988 (JP-63-2353A), Japanese Patent Application Laid-Open No. 19719/1979 (JP-54-19719A), and others)].

The preferred phosphoric ester amide includes condensed phosphoric ester amides having high molecular weight. As such a phosphoric ester amide, for example, there may be mentioned an N-(diaryloxyphosphinyl)-substituted alkyleneamine [e.g., N,N'-bis(diphenoxyphosphinyl)piperazine, N,N'-bis(ditolyloxyphosphinyl)piperazine, N,N'-bis(dixylyloxyphosphinyl)piperazine, N,N'-bis(di- or trimethylphenyloxyphosphinyl)piperazine]; a bis- to tetrakis[(diaryloxyphosphinyl)amino]-substituted aromatic compound [e.g., 1,3- or 1,4-bis[(diphenoxyphosphinyl)amino]benzene, 1,3- or 1,4-bis[(ditolyloxyphosphinyl)amino]benzene, 1,3- or 1,4-bis[(dixylyloxyphosphinyl)amino]benzene, 1,3- or 1,4-bis[(di- or trimethylphenyloxyphosphinyl)amino]benzene, 1,3- or 1,4-bis[ (diphenoxyphosphinyl)aminomethyl]benzene, 1,3- or 1,4-bis[(ditolyloxyphosphinyl)aminomethyl] benzene, 1,3- or 1,4-bis[(dixylyloxyphosphinyl)aminomethyl]benzene, 1,3- or 1,4-bis[(di- or trimethylphenyloxyphosphinyl)aminomethyl]benzene]; an N-(cyclic alkylenedioxyphosphinyl)-substituted alkyleneamine [e.g., N,N'-bis(neopentylenedioxyphosphinyl)piperazine];a bis to tetrakis[(cyclic alkylenedioxyphosphinyl) amino]-substituted aromatic compound [e.g., 1,3- or 1,4-bis [(neopentylenedioxyphosphinyl)amino]benzene, 1,3- or 1,4-bis[(neopentylenedioxyphosphinyl)aminomethyl]benzene]; an N-(cyclic arylenedioxyphosphinyl)-substituted alkyleneamine [e.g., N,N'-bis(phenylene-1,2-dioxyphosphinyl)piperazine, 1,3- or 1,4-bis[(biphenylene-2,2'-dioxyphosphinyl)aminomethyl]piperazine]; a bis to tetrakis[(cyclic arylenedioxyphosphinyl)amino]-substituted aromatic compound {e.g., 1,3- or 1,4-bis[(phenylene-1,2-dioxyphosphinyl)amino]benzene, 1,3- or 1,4-bis[(biphenylene-2,2'-dioxyphosphinyl)aminomethyl]benzene}, and a 3,9-bis(N-substituted amino)-2,4,8,10-tetraoxa-3,9-diphosphaspiro [5.5]-undecane-3,9-dioxide [e.g., a spiro ring-containing phosphoric ester amide of which the N-substituted amino group is a dialkylamino group (e.g., diethylamino group), a cyclic amino group (e.g., piperidino group, pipecolino group, dimethylpiperidino group, morpholino group), an arylamino group (e.g., phenylamino group), or an alkylarylamino group (e.g., methylphenylamino group)]. Such a phosphoric ester amide is commercially available as trade name "PHOSPHORIC ESTER AMIDE FLAME RETARDANT SP SERIES (e.g., SP-601, SP-670, SP-703, SP-720)" (manufactured by Shikoku Chemicals Corp.).

These phosphoric esters may be used singly or in combination.

The preferred phosphoric ester includes an aromatic phosphoric ester and a condensed phosphoric ester, and particularly a condensed phosphoric ester.

(B3) Nitrogen-containing cyclic compound

The nitrogen-containing cyclic compound includes a nitrogen-containing cyclic compound or a salt thereof, and others.

The nitrogen-containing cyclic compound includes a heterocyclic compound having at least one amino group, and at least one nitrogen atom as a hetero atom of a heterocycle. The heterocycle may have other hetero atom(s) such as sulfur and oxygen other than nitrogen. Such a nitrogen-containing heterocycle includes a 5- or 6-membered unsaturated nitrogen-containing heterocycle having a plurality of nitrogen atoms as constituent atoms thereof, for example, imidazole, thiadiazole, thiadiazoline, furazan, triazole, thiadiazine, pyrazine, pyrimidine, pyridazine, triazine, and purine. Among such nitrogen-containing rings, a 5- or 6-membered unsaturated nitrogen-containing ring having a plurality of nitrogen atoms as constituent atoms thereof is preferred, and in particular, triazole and triazine are preferred.

As the triazole compound, there may be mentioned a 1,2,3-triazole (e.g., a 1H-1,2,3-triazole; a 2H-1,2,3-triazole), a 1,2,4-triazole (e.g., a 1H-1,2,4-triazole such as guanazole; a 4H-1,2,4-triazole such as guanazine), and the like. The arbitrary atom constituting a triazole ring (particular carbon atom) has an amino group(s) as substituent(s). The number of the amino group is, for example, about 1 to 3, and preferably about 1 to 2.

The triazine compound includes a variety of triazines: a 1,3,5-triazine [for example, a melamine or a derivative thereof such as melamine, a substituted melamine (e.g., an alkylmelamine such as 2 -methylmelamine, guanylmelamine), a condensation product of a melamine (melamine condensate) (e.g., melam, melem, melon), and a copolycondensed resin of a melamine (e.g., a melamine-formaldehyde resin, a phenol-melamine resin, a benzoguanamine-melamine resin, an aromatic polyamine-melamine resin); a hydroxyl group-containing 1,3,5-triazine (e.g., cyanuric acid, and isocyanuric acid); a cyanuric amide (e.g., ammeline, ammelide); a guanamine or a derivative thereof (e.g., guanamine, methylguanamine, acetoguanamine, benzoguanamine, succinoguanamine and CTU-guanamine)], an amino group-containing 1,2,3-triazine (e.g., 1,2,3-triazine having an-amino group(s) as substituent(s) at 5-position, 4,5-positions or 4,5,6-positions, 4-amino-benzo-1,2,3-triazine), and an amino group-containing 1,2,4-triazine (e.g., 1,2,4-triazine having an amino group(s) as substituent(s) at 3-position, 5-position or 3,5-positions). The arbitrary atom constituting a triazine ring (particularly carbon atom) has an amino group(s) as substituent(s). The number of the amino group is, for example, about 1 to 4, preferably about 1 to 3, and more preferably about 2 to 3. Incidentally, the hydroxyl group-containing triazine may form a salt with other triazine (particularly an amino group-containing triazine, e.g., melamine, and a melamine condensate).

The preferred nitrogen-containing cyclic compound includes the amino group-containing triazine compound, particularly the amino group-containing 1,3,5-triazine (e.g., melamine, a melamine condensate, particularly melam and melem).

Examples of the salt of the nitrogen-containing cyclic compound include a salt of the nitrogen-containing cyclic compound (nitrogen-containing cyclic compound having an amino group) with an oxygen acid, an organic phosphoric acid, or an organic sulfonic acid.

(i) Salt of Nitrogen-Containing Cyclic Compound with Oxygen Acid

In the salt with an oxygen acid, the nitrogen-containing cyclic compound (nitrogen-containing cyclic compound having an amino group) may form a salt with an oxygen acid at a nitrogen atom site (imino group) constituting a ring. It is usually preferred to form a salt of an oxygen acid with at least one amino group which is a substituent of a ring of the cyclic compound. In the case having a plurality of amino groups, all amino groups may form a salt with the oxygen acid. Moreover, a plurality of nitrogen-containing compounds which are the same or different kind (the above-mentioned nitrogen-containing cyclic compound, or other nitrogen-containing compound which contains an amino group) may form a salt with one polyphosphoric acid to form a double salt (or complex salt) of a polyacid.

The oxygen acid includes nitric acid, a chloric acid (such as perchloric acid, chloric acid, chlorous acid, and hypochlorous acid), a phosphoric acid [e.g., a phosphoric acid (non-condensed phosphoric acid) and a polyphosphoric acid (condensed phosphoric acid)], a sulfuric acid (e.g., a non-condensed sulfuric acid such as peroxymonosulfuric acid, sulfuric acid, and sulfurous acid; a condensed sulfuric acid such as peroxydisulfuric acid, and pyrosulfuric acid), a boric acid (e.g., a non-condensed boric acid such as orthoboric acid, and metaboric acid; a condensed boric acid such as tetraboric acid, and boric anhydride), an antimonic acid, a molybdic acid, and a tungstic acid. Among others, a polyphosphoric acid, a sulfuric acid, and a boric acid are preferred.

The polyphosphoric acid also includes a condensed phosphoric acid represented by the following formula (3):

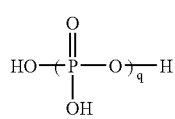

(3)

wherein "q" denotes an integer of not less than 2.

In the formula, "q" represents a condensation degree of the polyphosphoric acid. The number "q" may just be an integer of not less than 2, and is preferably an integer of 2 to 200, more preferably an integer of 3 to 200, and particularly an integer of 3 to 100.

Moreover, the polyphosphoric acid also includes a polymetaphosphoric acid $(HPO_3)_n$ (in the formula, "n" denotes an integer of not less than 2), hypophosphoric acid, phosphoric anhydride (diphosphorus pentoxide), and others.

Incidentally, in a polyphosphoric acid having a plurality of salifiable sites, at least part of sites may form a partial salt with other amino group-containing compound such as an amine or a urea (e.g., a partial salt such as an ammonium polyphosphate and a urea polyphosphate).

The salt of the oxygen acid includes, to take a melamine salt as an example, a non-condensed phosphate such as melamine orthophosphate; a polyphosphate such as melamine pyrophosphate; a non-condensed sulfate such as a melamine sulfate (e.g., melamine sulfate, dimelamine sulfate, guanylmelamine sulfate), and a melamine sulfite corresponding to the melamine sulfate; a condensed sulfate such as a melamine pyrosulfate (e.g., melamine pyrosulfate, dimelamine pyrosulfate); a non-condensed borate such as a melamine orthoborate (e.g., a mono- to trimelamine orthoborate), and a metaborate corresponding to the orthoborate; a condensed borate such as anhydrous melamine borate and melamine tetraborate; and others.

Moreover, the salt of the oxygen acid also includes a salt such as a melam salt, melem salt, melon salt, guanamine salt, acetoguanamine salt and benzoguanamine salt corresponding to the melamine salt of the oxygen acid, and a double salt (or complex salt) such as a melamine-melam double salt, a melamine-melam-melon double salt and a melam-melem double salt, and others.

Among the salts with oxygen acids, a salt of a nitrogen-containing cyclic compound (in particular a nitrogen-containing cyclic compound having an amino group) with a polyphosphoric acid is preferred. Examples of such a polyphosphate of a nitrogen-containing cyclic compound include a polyphosphate of an amino group-containing triazine compound [e.g., a melamine pyrophosphate (melamine pyrophosphate, dimelamine pyrophosphate), a melamine polyphosphate (such as a triphosphate and a tetraphosphate) corresponding to the melamine pyrophosphate; a melem salt, melam salt, melon salt or guanamine salt corresponding to the melamine polyphosphate]. Moreover, a triazole salt corresponding to the triazine salt may be also used. In particular, it is preferred to use a salt of at least one member selected from melamine and a melamine condensate with a polyphosphoric acid (particularly a polyphosphoric acid having a condensation degree of 3 to 100). Moreover, the polyphosphate also includes a melamine-melam-melem double salt of a polyphosphoric acid, a melamine-melam-melem double salt of metaphosphoric acid, and others.

Further, the nitrogen-containing cyclic compound may contain a sulfur atom derived from sulfuric acid. Such a nitrogen-containing cyclic compound includes a salt of a nitrogen-containing cyclic compound (particularly melamine, a melamine condensate) with a polyacid containing an atom such as a sulfur atom and an oxygen atom in addition to a phosphorus atom (e.g., a polyacid, having a phosphatosulfuric acid group, formed from phosphorus, sulfur and oxygen; a mixture of this polyacid and a polyphosphoric acid and/or pyrosulfuric acid; a mixture of a polyphosphoric acid and pyrosulfuric acid), a salt of the nitrogen-containing cyclic compound with a mixture of a phosphoric acid or a polyphosphoric acid and a sulfuric acid, and also includes a melamine-melammelem double salt. The nitrogen-containing cyclic compound containing a sulfur atom derived from a sulfuric acid may for example be obtained by mixing a nitrogen-containing cyclic compound, a phosphoric acid or polyphosphoric acid, and a sulfuric acid, and calcining the mixture, or may be obtained by mixing a nitrogen-containing cyclic compound and the polyacid, and calcining the mixture. The detailed these polyphosphates (including double salts) which may contain a sulfur atom can be referred to Japanese Patent Application Laid-Open No. 306081/1998 (JP-10-306081A), Japanese Patent Application Laid-Open No. 306082/1998 (JP-10-306082A), and others.

These polyphosphates may be treated with the use of a surface-modifying agent such as an epoxy-series compound, a silane-series compound, a titanate-series compound, and a chromium-series compound. The use of the polyphosphate not only imparts high flame retardancy to the polyester-series resin, but also causes no possibility of staining (or coloring) in the resin composition.

The proportion of the nitrogen-containing cyclic compound relative to the polyphosphoric acid is not particularly limited to a specific one, and the former/the latter (molar ratio) is, for example, about 1/20 to 20/1, preferably about 1/10 to 10/1 (e.g., about 1/5 to 10/1), and particularly about 1/2 to 8/1. The equivalence ratio of an amino group contained in the nitrogen-containing cyclic compound relative to a salifiable site of the polyphosphoric acid is also not particularly limited to a specific one, and is, for example, about 10/1 to 1/2, preferably about 5/1 to 1/1, and particularly about 4/1 to 1/1.

(ii) Salt of Nitrogen-Containing Cyclic Compound with Organic Phosphoric Acid

The organic phosphoric acid includes a partial ester of a non-condensed phosphoric acid [e.g., peroxyphosphoric acid, orthophosphoric acid, metaphosphoric acid, phosphorous acid (phosphonic acid), or hypophosphorous acid (phosphinic acid)], and phosphonic acid or phosphinic acid each having an organic group as a substituent. It is sufficient that the organic phosphoric acid may just have at least one site salifiable with the nitrogen-containing cyclic compound (particularly a nitrogen-containing cyclic compound having an amino group).

The organic phosphoric acid may form a salt with the nitrogen-containing cyclic compound at part or whole of salifiable site(s), and both of the salts may be used. Such an organic phosphate includes, to take a melamine salt as an example, a melamine salt of an organic phosphoric ester (e.g., salt of pentaerythritol bisphosphate with melamine, salt of pentaerythritol bisphosphate with dimelamine); a melamine salt of a $C_{1-6}$alkyl-substituted phosphorous acid; a melamine salt of a mono- or diphosphorous ester of a $C_{1-6}$aliphatic diol (e.g., salt of 1-hydroxyethylidene-1,1-diphosphorous acid with dimelamine, salt of 1-hydroxyethylidene-1,1-diphosphorous acid with tetramelamine); tetramelamine salt of nitrilotris(methylphosphonic acid) (tetramelamine salt of [nitrilotris(methylene)]trisphosphonic acid), hexamelamine salt of nitrilotris(methylphosphonic acid) (hexamelamine salt of [nitrilotris(methylene)]trisphosphonic acid); a melamine salt of a $C_{6-10}$arylphosphorous acid, (melamine salt of phenylphosphorous acid, dimelamine salt of phenylphosphorous acid), a melamine salt of a phosphinicocarboxylic acid (a melamine salt of an arylphosphinicocarboxylic acid, such as melamine salt of 3-(phenylphosphinico)propionic acid and dimelamine salt of 3-(phenylphosphinico)propionic acid); and others. Moreover, there maybe also used a double salt corresponding to the melamine salt, such as salt of pentaerythritol bisphosphate with melamine and melem.

(iii) Salt of Nitrogen-Containing Cyclic Compound with Organic Sulfonic Acid

Examples of the salt of the nitrogen-containing cyclic compound with an organic sulfonic acid include a salt of a melamine (e.g., melamine, melam, melem) with an organic sulfonic acid [e.g., a $C_{1-10}$alkylsulfonic acid (such as methanesulfonic acid, ethanesulfonic acid, and ethanedisulfonic acid), a $C_{6-20}$arylsulfonic acid (such as benzenesulfonic acid, and toluenesulfonic acid)], a double salt thereof, and others.

[Proportion of Flame Retardant]

By using the flame retardant of the present invention in combination with at least one member selected from a polyphenylene oxide-series resin and a polyphenylene sulfide-series resin, a phosphoric ester, and a nitrogen-containing cyclic compound, the flame retardant imparts high flame retardancy to the base resin without deteriorating properties of the base resin (e.g., without possibility of staining or bleeding out), and the amount to be added of the flame retardant can be reduced. The proportion of the flame retardant relative to the base resin is about 10 to 300 parts by weight, preferably about 20 to 250 parts by weight, and more preferably about 30 to 200 parts by weight, relative to 100 parts by weight of the base resin.

The proportions of each component in the flame retardant may be suitably selected within the range that flame retardancy can be imparted to a resin. For example, the proportion of the polyphenylene oxide-series resin and/or polyphenylene sulfide-series resin (B1) is about 5 to 500 parts by weight, preferably about 10 to 450 parts by weight (e.g., about 30 to 450 parts by weight), and more preferably about 15 to 400 parts by weight (e.g., about 50 to 400 parts by weight), relative to 100 parts by weight of the phosphoric ester (B2). The proportion of the nitrogen-containing cyclic compound (B3) is, for example, about 0 to 1000 parts by weight, about 0 to 700 parts by weight, and more preferably about 0 to 500 parts by weight, relative to 100 parts by weight of the phosphoric ester(B2).

[Inorganic Filler (C)]

In the present invention, the combination use of the flame retardant (B), and the inorganic filler (C) treated with a surface-treatment agent or sizing agent containing a novolak epoxy resin inhibits dripping from a resin composition at a high temperature, and ensures high flame retardancy.

The inorganic filler includes a fibrous filler such as a glass fiber, an asbestos fiber, a carbon fiber, a silica fiber, a silica-alumina fiber, a zirconia fiber, a potassium titanate fiber, and a metal fiber (e.g., a chopped strand, a roving); and a non-fibrous filler such as a plate-like filler (e.g., a glass flake, a mica, a graphite, a variety of metal foil), and a particulate filler [for example, a carbon black, a silica, a powder of quartz, a glass bead, a glass powder, a milled fiber (such as a milled glass fiber), a silicate (e.g., a calcium silicate, an aluminum silicate, a kaolin, a talc, a clay, a diatomite, a wollastonite); a metal oxide (e.g., an iron oxide, a titanium oxide, a zinc oxide, an alumina); a metal carbonate (e.g., a calcium carbonate, a magnesium carbonate); a metal sulfate (e.g., a calcium sulfate, a barium sulfate); and a metal powder (such as a silicon carbide)].

In the fibrous filler, the fiber length of the chopped strand is, for example, about 10 to 100000 μm, preferably about 20 to 8000 μm, and more preferably about 30 to 5000 μm. Moreover, the fiber diameter is, for example, about 1 to 50 μm, preferably about 2 to 40 μm, and more preferably 3 to 30 μm.

In the plate-like filler, the particle size is not less than 20 μm and preferably about 25 to 500 μm, and the thickness is about 0.1 to 10 μm and preferably about 0.3 to 5 μm.

In the particulate filler, the particle size is, for example, not more than 100 μm (e.g., about 0.1 to 80 μm), preferably about 0.2 to 70 μm, and more preferably about 0.3 to 60 μm.

Such inorganic fillers may be used singly or in combination. The preferred inorganic filler includes a glass fiber, and a glass flake.

The surface-treatment agent or sizing agent for treating the inorganic filler comprises a novolak epoxy resin. It seems that the surface treatment of the inorganic filler with the novolak epoxy resin improves flame retardancy (particularly inhibits dripping) probably because such a surface treatment facilitates carbonization (particularly such a surface treatment forms a carbonized firm coating on the surface of the inorganic filler) in compared with a treatment with other surface-treatment agent or sizing agent (e.g., a bisphenol A-based epoxy resin).

Examples of the novolak resin constituting the novolak epoxy resin include a hovolak resin in which an alkyl group (e.g., a $C_{1-20}$alkyl group, preferably a $C_{1-4}$alkyl group such as methyl group and ethyl group) may be substituted on the aromatic ring (e.g., a phenol-novolak resin, a cresol-novolak resin). The preferred novolak epoxy resin includes a glycidyl ether of a novolak resin which may be substituted with a $C_{1-2}$alkyl group. Incidentally, the novolak epoxy resin may be used in combination with a conventional sizing agent or surface-treatment agent, e.g., a functional compound such as an epoxy-series compound (e.g., a bisphenol A-based epoxy resin, a bisphenol A-based phenoxy resin), a urethane-series resin, an acrylic resin, a vinyl acetate-series resin, a fluorine-series resin, a silane-series compound and a titanate-series compound, a lubricant, an antistatic agent, and others.

The number average molecular weight of the novolak epoxy resin is, for example, about 200 to 50,000, preferably about 300 to 10,000, and more preferably about 400 to 6,000 (e.g., about 400 to 5,000).

The treatment of the inorganic filler is not particularly limited to a specific one. For example, the inorganic filler may be pretreated with the surface-treatment agent or sizing agent, and added to the resin composition, or may be treated by adding the surface-treatment agent or sizing agent to the kneading system with preparing the resin composition.

In the surface treatment, the amount of the surface-treatment agent or sizing agent is about 0.01 to 30 parts by weight, preferably about 0.05 to 20 parts by weight, and more preferably about 0.1 to 5 parts by weight, relative to 100 parts by weight of the inorganic filler.

The production process of the inorganic filler may be referred to Japanese Patent Application Laid-Open No. 248743/1988 (JP-63-248743A), Japanese Patent Application Laid-Open No. 48440/1990 (JP-2-48440A), Japanese Patent Application Laid-Open No. 79793/1999 (JP-11-79793A), Japanese Patent Application Laid-Open No. 172055/2001 (JP-2001-172055A), and others.

The proportion of the surface-treated inorganic filler (C) is about 1 to 200 parts by weight, preferably about 3 to 180 parts by weight, and more preferably about 5 to 150 parts by weight, relative to 100 parts by weight of the polyester-series resin (A).

[Additive]

If necessary, the flame-retardant resin composition of the present invention may comprise a variety of additives (for example, a styrenic resin (D), other flame-retardant auxiliary or synergist (or flame retardant) (E), an antioxidant (F), a stabilizer (G), a dripping inhibitor (H)). The total content of the additive(s) is about 0.01 to 50 parts by weight, preferably about 0.1 to 40 parts by weight, and more preferably about 0.5 to 35 parts by weight, relative to 100 parts by weight of the polyester-series resin.

(D) Styrenic Resin

The resin composition of the present invention may further comprise a styrenic resin.

As the styrenic resin, for example, there may be mentioned a homo- or copolymer of a styrenic monomer (e.g., styrene, vinyltoluene, α-methylstyrene); a copolymer of the styrenic monomer and a vinyl monomer [e.g., an unsaturated nitrile (such as acrylonitrile), an α,β-monoolefinic unsaturated carboxylic acid or acid anhydride or an ester thereof (such as a (meth)acrylic acid ester, (meth)acrylic acid, and maleic anhydride)]; a styrenic graft copolymer; a styrenic block copolymer; an epoxy-modified styrenic resin which is modified with a peroxide; and others.

The preferred styrenic resin includes a polystyrene [GPPS, SPS (syndiotactic polystyrene)], a styrene-methyl methacrylate copolymer, a styrene-(meth)acrylic acid copolymer, a styrene-glycidyl (meth)acrylate copolymer, a styrene-maleic anhydride copolymer, a styrene-acrylonitrile copolymer (AS resin), a styrene-acrylonitrile-glycidyl (meth)acrylate copolymer, a high impact polystyrene (HIPS) in which a styrenic monomer is polymerized to a rubber component, and a polystyrenic graft or block copolymer. As the polystyrene-series graft copolymer, there maybe mentioned a copolymer in which at least a styrenic monomer and a copolymerizable monomer are grafted to a rubber component (for example, ABS resin which is obtained by graft polymerization of styrene and acrylonitrile to a polybutadiene, AAS resin which is obtained by graft polymerization of styrene and acrylonitrile to an acrylic rubber, ACS resin which is obtained by graft polymerization of styrene and acrylonitrile to a chlorinated polyethylene, a polymer which is obtained by graft polymerization of styrene and acrylonitrile to an ethylene-vinyl acetate copolymer, a polymer which is obtained by graft polymerization of styrene and acrylonitrile to an ethylene-propylene rubber, MBS resin which is obtained by graft polymerization of styrene and methyl methacrylate to a polybutadiene, a resin which is obtained by graft polymerization of styrene and acrylonitrile to a styrene-butadiene copolymer rubber). The block copolymer includes a copolymer comprising a polystyrenic block and a diene or olefinic block (e.g., a styrene-butadiene-styrene (SBS) block copolymer, a styrene-isoprene block copolymer, a styrene-isoprene-styrene (SIS) block copolymer, a hydrogenated styrene-butadiene-styrene (SEBS) block copolymer, a hydrogenated styrene-isoprene-styrene (SEPS) block copolymer), an epoxy-modified SBS, an epoxy-modified SIS, and others.

The number average molecular weight of the styrenic resin is not particularly limited to a specific one, and may for example be selected within the range of about $5 \times 10^3$ to $200 \times 10^4$, preferably about $1 \times 10^4$ to $150 \times 10^4$, and more preferably about $1 \times 10^4$ to $100 \times 10^4$.

These styrenic resins may be used singly or in combination. The content of the styrenic resin may for example be selected within the range of about 0 to 30 parts by weight, preferably about 0 to 20 parts by weight, and particularly about 0 to 15 parts by weight, relative to 100 parts by weight of the polyester-series resin.

(E) Flame-Retardant Auxiliary

Examples of the flame-retardant auxiliary (or flame-retardant synergist) include a resinous flame-retardant auxiliary (E1), an inorganic flame-retardant auxiliary (E2), or others. These flame-retardant auxiliaries may be used singly or in combination.

(E1) Resinous Flame-Retardant Auxiliary

The resinous flame-retardant auxiliary (or flame retardant) includes an aromatic-series resin (aromatic resin) such as (i) a resin of which the main chain or side chain contains an aromatic ring having at least one group selected from a hydroxyl group and an amino group, (ii) a polyarylate-series resin, (iii) an aromatic epoxy resin, and (iv) a polycarbonate-series resin.

(i) Resin of which the Main Chain or Side Chain Contains an Aromatic Ring having at least One Group Selected from a Hydroxyl Group and an Amino Group The resin of which the main chain contains the aromatic ring includes (i-1) a novolak resin, (i-2) an aniline-aldehyde resin, (i-3) an aralkyl resin, and others. As the resin of which the side chain contains the aromatic ring, there may be mentioned (i-4) an aromatic vinyl resin.

(i-1) Novolak Resin

The novolak resin includes a random phenol-novolak resin (e.g., a monomerless phenol-novolak resin, and a dimerless phenol-novolak resin; for example, such resins are procurable from Sumitomo Durez Co., Ltd. as trade name "SUMILITE RESIN PR-53647", "SUMILITE RESIN PR-NMD-100 series", and "SUMILITE RESIN PR-NMD-200 series"), a high-orthonovolak resin [e.g., a high-orthonovolak resin having an ortho/para ratio of not less than 1 (e.g., about 1 to 20 (particularly about 1 to 15)); for example, such a resin is procurable from Sumitomo Durez Co., Ltd. as trade name "SUMILITE RESIN HPN series"], a cresol-novolak resin, an aminotriazine-modified phenol-novolak resin, and others. The novolak resin is usually obtainable by a reaction of a phenol with an aldehyde (e.g., an aliphatic aldehyde such as formaldehyde and acetaldehyde; an aromatic aldehyde such as phenylacetaldehyde; a condensate of formaldehyde such as trioxane and paraformaldehyde). Examples of the phenol include a monohydric phenol such as phenol, p- or m-cresol, 3,5-xylenol, an alkylphenol (e.g., a $C_{1-20}$alkylphenol such as t-butylphenol and octylphenol), and an arylphenol (e.g., phenylphenol, benzylphenol, and cumylphenol). The proportion (molar ratio) of the phenol relative to the aldehyde [the former/the latter] is about 2/1 to 1/1.

The aminotriazine-modified novolak resin is a co-condansate of the phenol with a triazine as a co-condensable component (e.g., urea, cyanuric acid, isocyanuric acid, melamine, guanamine, acetoguanamine, and benzoguanamine), and is, for example, available from Dainippon Ink And Chemicals, Inc. as trade name"PHENOLITE". Moreover, the novolak resin also includes a resin obtained by using an aniline as a co-condensate component (e.g., aniline, o-toluidine, N-benzylaniline, and α- or β-naphthylamine).

The number average molecular weight of the novolak resin is not particularly limited to a specific one, and is, for example, about 300 to $5 \times 10^4$, preferably about 300 to $1 \times 10^4$, and more preferably about 300 to 8000 (particularly, about 300 to 5000).

(i-2) Aniline-Aldehyde Resin

Examples of the aniline-aldehyde resin include a resin obtainable by a condensation of an aniline with an aldehyde. The aldehyde includes an aldehyde exemplified in the paragraph of the novolak resin (e.g., formaldehyde), in addition furfural, benzaldehyde, or a mixture thereof, and others. Moreover, the aniline includes aniline, o-toluidine, N-benzylaniline, α- or β-naphthylamine, or a mixture thereof, and others. Further, examples of the aniline-aldehyde resin also include a resin obtainable by using, as a co-condensable component, a phenol, urea, a triazine (a melamine or a derivative thereof, such as melamine, cyanuric acid and isocyanuric acid; a guanamine or a derivative thereof, such as guanamine, acetoguanamine and benzoguanamine).

The proportion (molar ratio) of the aniline relative to the aldehyde [the former/the latter] is about 2/1 to 1/1.

(i-3) Aralkyl Resin

The aralkyl resin includes a phenol-aralkyl resin obtainable by a reaction of an aralkyl [an aralkyl ether such as a xylylene glycol $C_{1-4}$alkyl ether (e.g., p-xylylene glycol dimethyl ether, p-xylylene glycol diethyl ether); an acyloxyaralkyl such as p-xylylene-α,α'-diacetate; an aralkyldiol such as p-xylylene-α,α'-diol; an aralkyl halide such as p-xylylene-α,α'-dichloride and p-xylylene-α,α'-dibromide] with a phenol (a phenol and an alkylphenol which are exemplified in the paragraph of the novolak resin); an aniline-aralkyl resin obtainable by a reaction of the aralkyl with the aniline [aniline, an alkylaniline (e.g., a $C_{1-20}$alkylaniline such as toluidine and xylidine), and by a reaction of the aralkyl with an N-alkylaniline (e.g., an N-$C_{1-4}$alkylaniline such as N,N-dimethylaniline)]; and others. Moreover, as other aralkyl resin, there may be used an aralkyl resin described in Japanese Patent Application Laid-Open No. 351822/2000 (JP-2000-351822A). If necessary, the aralkyl resin may be cured or epoxy-modified.

The proportion of the aralkyl relative to the phenol or aniline [the former/the latter] is, for example, about 1/1 to 1/3 (molar ratio), and preferably about 1/1 to 1/2.5 (molar ratio).

(i-4) Aromatic Vinyl Resin

The aromatic vinyl resin includes a homo- or copolymer of an aromatic vinyl monomer. As the aromatic vinyl monomer, for example, there may be mentioned a hydroxyl group-containing aromatic vinyl monomer such as vinylphenol, dihydroxystyrene and vinylnaphthol. These aromatic vinyl monomers may be used singly or in combination.

Examples of the other copolymerizable monomer are a (meth)acrylic monomer [e.g., (meth)acrylic acid, a (meth)acrylate (e.g., a $C_{1-18}$alkyl (meth)acrylate such as methyl (meth)acrylate; (meth)acrylamide; and (meth)acrylonitrile], a styrenic monomer (e.g., styrene, vinyltoluene, and α-methylstyrene), a polymerizable polycarboxylic acid (e.g., fumaric acid, and maleic acid), a maleimide-series monomer (e.g., maleimide, and an N-alkylmaleimide), a diene-series monomer (e.g., isoprene, and 1,3-butadiene), and a vinyl-series monomer (e.g., a vinyl ester such as vinyl acetate; a vinyl ketone such as methyl vinyl ketone; and a vinyl ether such as vinyl isobutyl ether). These copolymerizable monomers may be used either singly or in combination.

The ratio of the vinyl monomer relative to the copolymerizable monomer is, for example, about 10/90 to 100/0 (% by weight), preferably about 30/70 to 100/0 (% by weight), and more preferably about 50/50 to 100/0 (% by weight).

The preferred aromatic vinyl resin includes a polyvinylphenol resin [e.g., a vinylphenol homopolymer (a polyhydroxystyrene), particularly a p-vinylphenol homopolymer], a vinylphenol-styrene copolymer, and others.

There is no particular restriction as to the number average molecular weight of the aromatic vinyl-series resin, and it may be selected within the range of, for example, 300 to $50 \times 10^4$, preferably 400 to $30 \times 10^4$, and more preferably about 500 to $5 \times 10^4$.

(ii) Polyarylate-Series Resin

As the polyarylate-series resin, there may be used a polyarylate-series resin obtained through a polyesterification reaction of an aromatic polyol component with a polycarboxylic acid component (e.g., an aromatic polycarboxylic acid component, an aliphatic polycarboxylic acid component, and an alicyclic polycarboxylic acid component). It is preferred that the polycarboxylic acid component usually contains at least an aromatic polycarboxylic acid component.

The polyarylate-series resin includes a polyarylate-series resin in which an aromatic polyol component is a benzenediol and/or a bisphenol and a polycarboxylic acid component is an aromatic polycarboxylic acid, and for example includes a polyester obtained from a benzenediol (e.g., hydroquinone, resorcinol, m-xylylene glycol, and p-xylylene glycol) and/or a bisphenol (e.g., bisphenol A, bisphenol AD, bisphenol F, and biphenol) and a benzenedicarboxylic acid (e.g., isophthalic acid, and terephthalic acid), and a polyester obtained from a bisphenol and a bis(arylcarboxylic acid) [e.g., a bis(carboxyaryl)$C_{1-4}$alkyl such as a bis(carboxyphenyl)methane, a bis(carboxyphenyl)ethane and a bis(carboxyphenyl)propane]. These polyarylate-series resins may be used singly or in combination.

Moreover, the polyarylate-series resin may be a resin using, if necessary an aromatic triol, an aromatic tetraol [e.g., 1,1,2,2-tetrakis(hydroxyphenyl)ethane], an aromatic tricarboxylic acid, or an aromatic tetracarboxylic acid, in addition to an aromatic diol and an aromatic dicarboxylic acid.

The terminal (or end) of the polyarylate-series resin may be blocked with (bonded to) an alcohol [e.g., a monohydric phenol which may have a $C_{1-10}$alkyl group and/or a $C_{6-10}$aryl group as a substituent (e.g., phenol, and a $C_{1-4}$alkyl-phenol), a $C_{1-20}$alkylmonoalcohol (e.g., methanol, and ethanol), a $C_{7-20}$aralkyl monoalcohol (e.g., benzyl alcohol)], or a carboxylic acid [e.g., a $C_{1-20}$aliphatic monocarboxylic acid (e.g., acetic acid, and propionic acid), a $C_{4-20}$alicyclic monocarboxylic acid (e.g., ccyclohexanecarboxylic acid), a $C_{7-20}$aromatic monocarboxylic acid (e.g., benzoic acid), a $C_{1-10}$aliphatic monocarboxylic acid having a $C_{6-20}$aromatic group as a substituent (e.g., phenylacetic acid)].

Moreover, the polyarylate-series resin may constitute a polymer alloy with other resin (e.g., a polyester, a polyamide, and a polycarbonate). The polymer alloy includes not only a simple mixture but also a transesterified polymer alloy or a polymer alloy containing a compatibilizing agent.

The number average molecular weight of the polyarylate-series resin is, for example, about 300 to $30 \times 10^4$, preferably about 500 to $10 \times 10^4$, and more preferably about 500 to $5 \times 10^4$.

(iii) Aromatic Epoxy Resin

Examples of the aromatic epoxy resin include an ether-series epoxy resin (e.g., a bisphenol-based epoxy resin) and an amine-series epoxy resin formed with an aromatic amine component.

Examples of the bisphenol constituting a bisphenol-based epoxy resin are the same as the bis(hydroxyaryl) listed above. The preferred bisphenol-based epoxy resin includes a glycidyl ether of a bis(hydroxyaryl)$C_{1-6}$alkane, particularly bisphenol A, bisphenol AD, bisphenol F or the like. Moreover, examples of the bisphenol-based epoxy resin also include the above-mentioned bisphenol glycidyl ether of high molecular weight (that is, a phenoxy resin).

Examples of the aromatic amine component constituting the amine-series epoxy resin are a monocyclic aromatic amine (e.g., aniline, toluidine), a monocyclic aromatic diamine (e.g., diaminobenzene, xylylenediamine), a monocyclic aromatic aminoalcohol (e.g., aminohydroxybenzene), a polycyclic aromatic diamine (e.g., diaminodiphenylmethane), and a polycyclic aromatic amine.

The number average molecular weight of the epoxy resin is, for example, about 200 to 50,000, preferably about 300 to 10,000, and more preferably about 400 to 6,000 (e.g., about 400 to 5,000). Moreover, the number average molecular weight of the phenoxy resin is, for example, about 500 to 50,000, preferably 1,000 to 40,000, and more preferably about 3,000 to 35,000.

The epoxy resin may be used in a cured state, and the curing is effected by the use of a curing agent, e.g., an amine-series curing agent (e.g., an aliphatic amine such as ethylenediamine; an aromatic amine such as metaphenylenediamine and xylylenediamine), a polyaminoamide-series curing agent, an acid and acid anhydride-series curing agent.

These resin components may be used singly or in combination.

(iv) Polycarbonate-Series Resin

The polycarbonate-series resin includes a polymer obtainable through the reaction of a dihydroxy compound with phosgene or a carbonic ester such as diphenyl carbonate. Examples of the dihydroxy compound include an alicyclic compound (e.g., an alicyclic diol exemplified in the paragraph of the polyester-series resin), a bisphenol compound, and others. Incidentally, at least one member of the dihydroxy compound and the carbonic ester is an aromatic compound.

The bisphenol compound includes a bisphenol exemplified in the paragraph of the novolak resin (in particular a bis(hydroxyaryl)$C_{1-6}$alkane, a bis(hydroxyaryl)$C_{4-10}$cycloalkane, 4,4'-dihydroxydiphenyl ether; 4,4'-dihydroxydiphenyl sulfone; 4,4'-dihydroxydiphenyl sulfide; 4,4'-dihydroxydiphenyl ketone; and others).

The content of the resinous flame-retardant auxiliary may for example be selected within the range of about 1 to 30 parts by weight, preferably about 3 to 25 parts by weight, and more preferably about 5 to 20 parts by weight relative to 100 parts by weight of the polyester-series resin.

These resinous flame-retardant auxiliaries may be used singly or in combination.

(E2) Inorganic Flame-Retardant Auxiliary

As the inorganic flame-retardant auxiliary (or flame retardant) (E2), there may be mentioned a metal salt of an inorganic acid (i), a metal oxide (ii), a metal hydroxide (iii), a metal sulfide (iv), a red phosphorus (v), and others.

(i) Metal Salt of Inorganic Acid

As the inorganic acid constituting the salt, there may be used an oxygen acid [for example, an oxygen acid, e.g., nitric acid, a chloric acid (such as perchloric acid chloric acid, chlorous acid and hypochlorous acid), a phosphoric acid, a sulfuric acid, a boric acid, a chromic acid, an antimonic acid], a halogen acid (e.g., a hydrochloric acid), a carbonic acid, and others. Incidentally, the phosphoric acid, the sulfuric acid and the boric acid may be non-condensed or condensed, and there may be used a phosphoric acid, a sulfuric acid and a boric acid, each exemplified in the paragraph of the salt of the oxygen acid in the nitrogen-containing cyclic compound (B3).

A metal forming a salt with the inorganic acid includes an alkali metal (e.g., potassium, sodium); an alkaline earth metal (e.g., magnesium, calcium, barium); a transition metal [e.g., the metal of the Group 3A of the Periodic Table of Elements (such as scandium); the metal of the Group 4A of the Periodic Table of Elements (such as titanium); the metal of the Group 5A of the Periodic Table of Elements (such as vanadium); the metal of the Group 6A of the Periodic Table of Elements (such as chromium, molybdenum and tungsten); the metal of the Group 7A of the Periodic Table of Elements (such as manganese); the metal of the Group 8 of the Periodic Table of Elements (such as iron, cobalt, nickel and palladium); and the metal of the Group 1B of the Periodic Table of Elements (such as copper and silver)], the metal of the Group 2B of the Periodic Table of Elements (such as zinc, cadmium and mercury), the metal of the Group 3B of the Periodic Table of Elements (such as aluminum), the metal of the Group 4B of the Periodic Table of Elements (such as tin and lead), and the metal of the Group 5B of the Periodic Table of Elements (such as antimony and bismuth). These metals may be used singly or in combination.

(i-1) Metal Phosphate

The phosphoric acid includes a non-condensed phosphoric acid, a condensed phosphoric acid (a polyphosphoric acid), and others. In particular, a non-condensed phosphoric acid is preferred.

The metal preferably includes a polyvalent metal, for example, the alkaline earth metal, the transition metal and the metals of the Groups 2B and 3B of the Periodic Table of Elements, particularly the alkaline earth metal.

As the metal phosphate (or metal salt of a phosphoric acid), there may be mentioned a salt of the phosphoric acid with the polyvalent metal, in addition a hydrogenphosphate corresponding to the polyvalent metal phosphate. The metal salt may have a ligand (e.g., hydroxo, halogen).

As the metal phosphate, there may be used, for example, a pyrophosphate (such as $Ca_2P_2O_7$), a polymetaphosphate (such as $Ca_3(P_3O_9)_2$), a salt of anhydrous phosphoric acid (such as $Ca_2(P_4O_{12})$ and $Ca_5(P_3O_{10})_2$), in addition a condensed phosphate (such as $Ca_5(PO_4)_3(OH)$ and $Ca_5(PO_4)_3$ (F, Cl)), and there is preferably used a hydrogenphosphate.

Such a hydrogenphosphate includes, for example, a non-condensed hydrogenphosphate such as an alkaline earth metal hydrogenphosphate [e.g., a magnesium hydrogenorthophosphate (such as magnesium hydrogenphosphate and magnesium dihydrogenphosphate), a calcium hydrogenorthophosphate (such as calcium dihydrogenphosphate and calcium secondary phosphate)]; a transition metal hydrogenphosphate [e.g., manganese hydrogenphosphate (such as manganese(III) hydrogenphosphate), iron hydrogenphosphate (such as $Fe(H_2PO_4)_3$)]; a hydrogenphosphate of the metal of the Group 2B of the Periodic Table of Elements (such as zinc hydrogenphosphate and cadmium hydrogenphosphate); a hydrogenphosphate of the metal of the Group 3B of the Periodic Table of Elements (such as aluminum hydrogenphosphate); and a hydrogenphosphate of the metal of the Group 4B of the Periodic Table of Elements (such as tin hydrogenphosphate). Among them, a substantially anhydrous metal hydrogenphosphate, particularly an alkaline earth metal hydrogenphosphate [such as magnesium dihydrogenphosphate, calcium dihydrogenphosphate and calcium secondary phosphate ($CaHPO_4$)], is preferred.

(i-2) Metal Borate

The boric acid preferably includes a non-condensed boric acid such as orthoboric acid and metaboric acid; a condensed boric acid such as pyroboric acid, tetraboric acid, pentaboric acid and octaboric acid; and a basic boric acid.

As the metal, the alkali metal may be used, and it is preferred to use a polyvalent metal such as the alkaline earth metal, the transition metal and the metal of the Group 2B of the Periodic Table of Elements.

The metal borate is usually a salt hydrate and includes, for example, a non-condensed borate [e.g., a non-condensed borate of an alkaline earth metal (such as calcium orthoborate and calcium metaborate); a non-condensed borate of a transition metal (such as manganese orthoborate and copper metaborate); a non-condensed borate of the metal of the Group 2B of the Periodic Table of Elements (such as zinc metaborate and cadmium metaborate), in particular metaborate], a condensed borate [e.g., a condensed borate of an alkaline earth metal (such as trimagunesium tetraborate and calcium pyroborate); a condensed salt of a transition metal (such as manganese tetraborate and nickel diborate); a condensed borate of the metal of the Group 2B of the Periodic Table of Elements (such as zinc tetraborate and cadmium tetraborate)], and a basic borate (e.g., a basic borate of the metal of the Group 2B of the Periodic Table of Elements, such as basic zinc borate and basic cadmium borate). Moreover, a hydrogenborate corresponding to the borate (e.g., manganese hydrogenorthoborate) may be also employed. In particular, a borate of the alkaline earth metal or metal of the Group 2B of the Periodic Table of Elements (a non-condensed or condensed borate) (particularly a (hydrous) calcium borate, a (hydrous) zinc borate) is preferred.

As a metal salt of an inorganic acid (oxygen acid: e.g., a stannic acid, a molybdic acid, and a tungstic acid) other than a phosphoric acid and a boric acid, there may be used various metal salts corresponding to the metal phosphate and metal borate.

(ii) Metal Oxide

The metal oxide includes, for example, molybdenum oxide, tungstic oxide, titanium oxide, zirconium oxide, tinoxide, copperoxide, zincoxide, aluminumoxide, nickel oxide, iron oxide, manganese oxide, antimony trioxide, antimony tetraoxide, antimony pentaoxide, and others.

(iii) Metal Hydroxide

The metal hydroxide includes, for example, aluminum hydroxide, magnesium hydroxide, tin hydroxide, zirconium hydroxide, nickel hydroxide, and magnesium hydroxide modified with nickel hydroxide.

(iv) Metal Sulfide

As the metal sulfide, there may be mentioned zinc sulfide, molybdenum sulfide, tungstic sulfide, and others.

(v) Red Phosphorus

As the red phosphorus, usually, a red phosphorus which has undergone stabilization treatment (that is, a stabilized red phosphorus) is preferably employed. Particularly preferred are a red phosphorus which is obtained by finely dividing without pulverization and formation of the pulverized surface highly reactive to water or oxygen, and a red phosphorus the surface of which is coated with one member or a combination of two or more members selected from resins (e.g., thermosetting resins, thermoplastic resins), metals, metal compounds (e.g., metal hydroxides, metal oxides).

Exemplified as the thermosetting resin are a phenolic resin, a melamine-series resin, a urea-based resin, an alkyd resin, an unsaturated polyester-series resin, an epoxy resin, and a silicone-series resin, and examples of the thermoplastic resin are a polyester-series resin, a polyamide-series resin, an acrylic resin, an olefinic resin, and others.

Examples of the metal hydroxide are aluminum hydroxide, magnesium hydroxide, calcium hydroxide, zinc hydroxide, and titanium hydroxide. Examples of the metal oxide are aluminum oxide, magnesium oxide, zinc oxide, titanium oxide, zirconium oxide, copper oxide, iron oxide, molybdenum oxide, tungsten oxide, manganese oxide, and tin oxide.

Further, a process for coating with a metal the surface of the red phosphorus for stabilization includes a coating process with a metal (e.g., iron, nickel, copper, aluminum, zinc, manganese, tin, titanium, zirconium) or an alloy thereof through electroless plating. Other processes for coating the surface of a red phosphorus include a process in which red phosphorus is treated with a solution of a metal salt (e.g., a salt with aluminum, magnesium, zinc, titanium, copper, silver, iron, nickel) to form a metal phosphorus compound on the red phosphorus surface for stabilization of the red phosphorus.

In particular, with the use of a process comprising pulverizing the red phosphorus without forming a crushed surface thereon, the red phosphorus may be preferably subjected to coating treatment with a plurality of layers being a combination of a layer(s) of a metal component(s) (e.g., metal hydroxide, metal oxide) and a resin layer(s), particularly with a metal component layer covered by a plurality of resin layers. Such stabilized red phosphorus is excellent in heat stability and hydrolysis resistance and the amount of a phosphine produced upon decomposition in the presence of moisture or under high temperatures is so extremely small that they are preferable from the viewpoint of safety in the course of producing the resin composition of the present invention and a shaped article molded therefrom.

Such stabilized red phosphorus can be prepared referring to Japanese Patent Application Laid-Open No. 229806/1993 (JP-5-229806A), Japanese Patent Application Laid-Open No. 259956/1991 (JP-3-259956A), Japanese Patent Application Laid-Open No. 209991/1990 (JP-2-209991A), Japanese Patent Application Laid-Open No. 150309/1989 (JP-1-150309A), Japanese Patent Application Laid-Open No. 21704/1987 (JP-62-21704A), Japanese Patent Application Laid-Open No. 125489/1977 (JP-52-125489A), EP 296501A1, and EP249723A2.

As the red phosphorus, a stabilized one in the form of particles may be usually employed. The mean particle size of the stabilized red phosphorus is, for example, about 0.01 to 100 μm, preferably about 0.1 to 70 μm, and more preferably about 0.1 to 50 μm.

These inorganic flame-retardant auxiliaries may be used singly or in combination. The content of the inorganic flame-retardant auxiliary (in particular a metal salt of an inorganic acid) may for example be selected within the range of about 0.5 to 30 parts by weight, preferably about 2 to 20 parts by weight, and more preferably about 3 to 15 parts by weight, relative to 100 parts by weight of the polyester-series resin.

Incidentally, the flame-retardant resin composition of the present invention may comprise, in order to further impart flame retardancy to the composition, a second flame retardant(s) (E3), for example, a nitrogen-containing flame retardant (E3a), a sulfur-containing flame retardant (E3b), a silicon-containing flame retardant (E3c), an alcohol-based flame retardant (E3d), an expansive graphite (E3e), and others.

(E3a) Nitrogen-containing flame retardant

The nitrogen-containing flame retardant includes a urea compound (a non-cyclic urea compound, a cyclic urea compound), and guanidine compound.

Examples of the non-cyclic urea compound include urea, an N-substituted urea having a substituent such as an alkyl group, a non-cyclic urea condensate [for example, a polymer of urea (e.g., a dimer such as biuret, biurea, and IB nitrogen), a condensate of urea with an aldehyde compound (e.g., methylene diurea, ureaform, and a urea resin)], and others. Incidentally, the urea resin also includes a resin obtained by using, as a co-condensable component, a phenol, a triazine (e.g., a melamine or a derivative thereof such as melamine, cyanuric acid, and isocyanuric acid; a guanamine or a derivative thereof such as guanamine, acetoguanamine, and benzoguanamine), an aniline (e.g., aniline, o-toluidine, N-benzylaniline, α- or β-naphthylamine), and others.

The cyclic compound having a urea unit (or cyclic urea compound) is not particularly limited to a specific one as far as the compound comprises at least one urea unit (—NH-CONH—) as a constituent unit of a ring thereof, and may be any of a monocyclic compound, and a condensed ring with an aromatic hydrocarbon ring or crosslinked ring. The cyclic urea compound includes a cyclic monoureide, a cyclic diureide, and others. Further, the cyclic urea compound also includes a cyclic thiourea compound corresponding to the above-mentioned cyclic urea compound. These cyclic urea compounds may be used singly or in combination.

As the cyclic monoureide, for example, there may be mentioned an alkyleneurea [e.g., a $C_{1-10}$alkyleneurea such as methyleneurea, ethyleneurea and crotonylideneurea (CDU) (preferably, a $C_{1-6}$alkyleneurea)], an alkenyleneurea (e.g., a $C_{2-10}$alkenyleneurea such as vinyleneurea and cytosine), an alkynyleneurea [e.g., a $C_{2-10}$alkynyleneurea (preferably, a $C_{2-6}$alkynyleneurea)], an aryleneurea (e.g., imesatin), a ureide of a dicarboxylic acid (e.g., parabanic acid, dimethylparabanic acid, barbituric acid, 5,5-diethylbarbituric acid, dilituric acid, dialuric acid, alloxan, alloxanic acid, isocyanuric acid, uramil), a ureide of a β-aldehydic acid (e.g., uracil, 5-methyluracil (thymine), dihydrouracil, urazole, benzolyene urea), a ureide of a α-hydroxy acid [e.g., a hydantoin compound such as hydantoin, 5,5-dimethylhydantoin, 1,1-methylenebis(5,5-dimethylhydantoin) and allantoin], or a derivative thereof.

As the cyclic diureide, for example, there may be mentioned uric acid, an alkyl-substituted uric acid (e.g., a $C_{1-4}$alkyluric acid such as 3-methyluric acid), pseudouric acid, acetyleneurea (glycoluril), a diureide of an α-hydroxy acid [e.g., 1,1-methylenebis(5,5-dimethylhydantoin), allantoin], a diurea such as p-urazine, a diureide of a dicarboxylic acid (e.g., alloxantin, purpuric acid), or a derivative thereof.

Further, among the compounds exemplified in the paragraph of the hydroxyl group-containing 1,3, 5-triazine, there may be used a compound having an enol form of a urea as a constituent unit [that is, a compound whose tautomer has a urea unit (such as ammeline and ammelide)], and others.

Among the cyclic urea compounds, the preferred compound includes a cyclic diureide having two urea units as a constituent unit of a ring thereof (including a cyclic thiourea having two urea units), in particular acetyleneurea, uric acid, and a derivative thereof.

The cyclic urea compound (particularly, the derivative of the acetyleneurea or uric acid) also includes a salt thereof. As the salt, there is not particularly limited to a specific one as far as forming a salt with the cyclic urea compound, and there may be mentioned a salt of the cyclic urea compound with at least one member selected from a triazine compound, an oxygen acid and an organic phosphoric acid, each exemplified in the paragraph of the nitrogen-containing cyclic compound, and metals exemplified in the paragraph of the above-mentioned (E2). In particular, a salt of the cyclic urea compound with the triazine compound and/or the metal is preferred. These salts may be used singly or in combination.

Among the above-mentioned triazine compounds, melamine, a melamine condensate (e.g., melem, melam, melon), and guanamine are particularly preferred as a triazine compound forming a salt.

As a metal forming a salt, there may be mentioned an alkali metal (e.g., sodium, potassium, and lithium), an alkaline earth metal (e.g., calcium, magnesium, and barium), and a transition metal (e.g., iron, copper, cobalt, and manganese).

The proportion of the cyclic urea compound relative to the salifiable component is not particularly limited to a specific one, and for example the former/the latter (molar ratio) is about 1/5 to 4/1, preferably about 1/3 to 2/1, and more preferably about 1/2 to 1/1.

The guanidine compound includes a non-cyclic guanidine compound and a cyclic guanidine compound. Examples of the non-cyclic guanidine compound include cyanoguanidine (dicyandiamide), glycocyamine, guanolin, creatine or a derivative thereof, and others. The cyclic guanidine compound includes a glycocyamidine (e.g., glycocyamidine, thioglycocyamidine, creatinine, 4-methylglycocyamidine), an oxalylguanidine (e.g., oxalylguanidine, 2,4-diiminoparabanic acid), an iminourazole (e.g., iminourazole, guanazine), malonylguanidine, tartronoylguanidine, mesoxalylguanidine, and others.

(E3b) Sulfur-Containing Flame Retardant

Examples of the sulfur-containing flame retardant include a sulfuric ester, in addition an organic sulfonic acid, sulfamic acid and an organic sulfamic acid, and a salt with these acids (e.g., an alkali metal salt, and an alkaline earth metal salt), an ester with these acids and an amide with these acids.

(E3c) Silicon-Containing Flame Retardant

The silicon-containing flame retardant includes a (poly) organosiloxane. As the (poly)organosiloxane, there may be mentioned a homopolymer such as a dialkylsiloxane (e.g., dimethylsiloxane), an alkylarylsiloxane (e.g., phenylmethylsiloxane), a diarylsiloxane, and a monoorganosiloxane (for instance, a polydimethylsiloxane, a polyphenylmethylsiloxane); or a copolymer; and others. Moreover, the (poly) organosiloxane also includes a branched organosiloxane [e.g., trade name "XC99-B5664" manufactured by Toshiba Silicone Co., Ltd., trade name "X-40-9243", "X-40-9244" and "X-40-9805" manufactured by Shin-Etsu Chemical Co., Ltd., and compounds described in Japanese Patent Application Laid-Open No. 139964/1998 (JP-10-139964A)], and a modified (poly)organosiloxane (for example, a modified silicone) having substituent(s) (such as an epoxy group, a hydroxyl group, a carboxyl group, an amino group, and an ether group) in the end or main chain of the molecule.

(E3d) Alcohol-Based Flame Retardant

Examples of the alcohol-based flame retardant include a polyhydric alcohol, an oligomeric polyhydric alcohol, an esterified polyhydric alcohol, a substituted alcohol, and a saccharide compound (e.g., a monosaccharide, a polysaccharide).

These second flame retardants (E3) may be used singly or in combination.

The content of the second flame retardant (E3) may for example be selected within the range of about 0 to 50 parts by weight (e.g., about 0.01 to 50 parts by weight), preferably about 0.05 to 30 parts by weight, and particularly about 0.1 to 20 parts by weight, relative to 100 parts by weight of the polyester-series resin.

Moreover, the flame-retardant resin composition of the present invention may comprise an antioxidant (F) or a stabilizer (G) to maintain thermal stability of the composition for a long term.

The antioxidant or the stabilizer includes a phenol-series (e.g., hindered phenols), a phosphorus-series, an amine-series (e.g., hindered amines), a sulfur-series, a hydroquinone-series, or a quinoline-series antioxidant (or stabilizer), an inorganic stabilizer, a compound having a functional group reactive to an active hydrogen atom (reactive stabilizer), and others.

(F1) Phenol-Series Antioxidant (Phenol-Series Stabilizer)

The phenol-series (phenolic) antioxidant preferably includes a hindered phenol (hindered phenol-series antioxidant), e.g., a $C_{2-10}$alkylene glycol-bis[3-(3,5-di-branched $C_{3-6}$alkyl-4-hydroxyphenyl) propionate] such as 1,6-hexanediol-bis[3-(3,5-di-t-butyl-4-hydroxyphenyl) propionate]; e.g., a di- or trioxy$C_{2-4}$alkylene glycol-bis[3-(3,5-di-branched $C_{3-6}$ alkyl-4-hydroxyphenyl) propionate] such as triethylene glycol-bis[3-(3-t-butyl-5-methyl-4-hydroxyphenyl) propionate]; e.g., a $C_{3-8}$alkylenetriol-bis[3-(3,5-di-branched $C_{3-6}$alkyl-4-hydroxyphenyl) propionate] such as glycerin-tris[3-(3,5-di-t-butyl-4-hydroxyphenyl) propionate]; and e.g., a $C_{4-8}$alkylene tetraol-tetrakis[3-(3,5-di-branched $C_{3-6}$alkyl-4-hydroxyphenyl) propionate] such as pentaerythritol-tetrakis[3-(3,5-di-t-butyl-4-hydroxyphenyl) propionate].

(F2) Phosphorus-Series (Phosphorus-Containing) Stabilizer or Antioxidant

The phosphorus-containing stabilizer (or antioxidant) includes an organic phosphorus-containing stabilizer, for example, triisodecyl phosphite, trisnonylphenyl phosphite, diphenylisodecyl phosphite, phenyldiisodecyl phosphite, 2,2-methylenebis(4,6-di-t-butylphenyl)octyl phosphite, 4,4'-butylidenebis(3-methyl-6-t-butylphenyl)ditridecyl phosphite, a bis- or tris(branched $C_{3-6}$alkylphenyl)phosphite [e.g., bis- or tris(2-t-butylphenyl)phenyl phosphite, tris(2,4-di-t-butylphenyl)phosphite, tris(2-t-butyl-4-methylphenyl) phosphite, tris(2,4-di-t-amylphenyl)phosphite], tris(2-cyclohexylphenyl)phosphite, a bis($C_{1-9}$alkylaryl)pentaerythritol diphosphite [e.g., bis(2,4-di-t-butylphenyl)pentaerythritol diphosphite, bis(2,4-di-t-butyl-4-methylphenyl)pentaerythritol diphosphite, bis(2,6-di-t-butyl-4-methylphenyl)pentaerythritol diphosphite, bis(nonylphenyl)pentaerythritol diphosphite], a triphenyl phosphate-series stabilizer (e.g., 4-phenoxy-9-a-(4-hydroxyphenyl)-p-cumenyloxy-3,5,8,10-tetraoxa-4,9-diphosphaspiro[5.5]undecane, tris(2,4-di-t-butylphenyl)phosphate), and a diphosphonite-series stabilizer (e.g., tetrakis(2,4-di-t-butyl)-4,4'-biphenylene diphosphonite). The phosphorus-containing stabilizer usually has a branched $C_{3-6}$alkylphenyl group (particularly, t-butylphenyl group).

(F3) Amine-Series Antioxidant

The amine-series antioxidant includes a hindered amine, for example, a tri- or tetra$C_{1-3}$alkylpiperidine or a derivative thereof [e.g., 2,2,6,6-tetramethylpiperidine which may have a substituent (such as methoxy, benzoyloxy or phenoxy group) at 4-position], a bis(tri-, tetra- or penta$C_{1-3}$alkylpiperidine) $C_{2-20}$alkylenedicarboxylic ester [e.g., bis(2,2,6,6-tetramethyl-4-piperidyl) oxalate, a melonate, adipate, sebacate and terephthalate corresponding to the oxalate; and bis(1,2,2,6,6-pentamethyl-4-piperidyl) sebacate], 1,2-bis(2,2,6,6-tetramethyl-4-piperidyloxy)ethane, phenylnaphthylamine, N,N'-diphenyl-1,4-phenylenediamine, and N-phenyl-N'-cyclohexyl-1,4-phenylenediamine.

(F4) Hydroquinone-Series Antioxidant

The hydroquinone-series antioxidant includes, for example, 2,5-di-t-butylhydroquinone, and the quinoline-series antioxidant includes, for example, 6-ethoxy-2,2,4-trimethyl-1,2-dihydroquinone. The sulfur-series antioxidant includes, for example, dilaurylthiodipropionate, distearylthiodiproionate, and others.

(G1) Inorganic Stabilizer

The inorganic stabilizer includes an inorganic metal-series stabilizer (or a mineral stabilizer) such as a hydrotalcite and a zeolite. As the hydrotalcite, hydrotalcites recited in Japanese Patent Application Laid-Open No. 1241/1985 (JP-60-1241A) and Japanese Patent Application Laid-Open No. 59475/1997 (JP-9-59475A), such as hydrotalcite compounds represented by the following formula are usable.

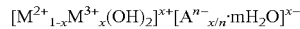

In the formula, $M^{2+}$ represents $Mg^{2+}$, $Mn^{2+}$, $Fe^{2+}$, $Co^{2+}$, or any of other divalent metal ions; $M^{3+}$ represents $Al^{3+}$, $Fe^{3+}$, $Cr^{3+}$, or any of other trivalent metal ions; $A^{n-}$ represents $CO_3^{2-}$, $OH^-$, $HPO_4^{2-}$, $SO_4^{2-}$, or any of other n-valent anions (particularly, monovalent or divalent anion); x is $0<x<0.5$; and m is $0 \leq m<1$.

Incidentally, the hydrotalcite is available from Kyowa Chemical Industry Co., Ltd. under the trade name "DHT-4A", "DHT-4A-2", or "Alcamizer".

The zeolite is not particularly limited to a specific one, and for example, zeolites recited in Japanese Patent Application Laid-Open No. 62142/1995 (JP-7-62142A) [zeolites the smallest unit cell of which is a crystalline aluminosilicate with an alkali and/or alkaline earth metal (A-, X-, Y-, L-, and ZSM-type zeolites, mordenite-type zeolite; chabazite, mordenite, faujasite, and other naturally-occurring zeolites)] may be employed.

Incidentally, A-type zeolite is available as "ZEOLAM-series (A-3, A-4, A-5)", "ZEOSTAR-series (KA100P, NA-100P, CA-100P)" or others, X-type zeolite as "ZEOLAM-series (F-9)", "ZEOSTAR-series (NX-100P)" or others, and Y-type zeolite as "HSZ-series (320NAA)" or others, from Tosoh Corp. or Nippon Chemical Industrial Co., Ltd. These inorganic stabilizers may be used singly or in combination.

(G2) Reactive Stabilizer

The reactive stabilizer includes a compound having a functional group reactive to an active hydrogen atom.

Examples of the compound having a functional group reactive to an active hydrogen atom include a compound having at least one functional group selected from the group consisting of a cyclic ether group [e.g., an oxetane group (or ring), an epoxy group], an acid anhydride group, an isocyanate group, an oxazoline group (or ring), an oxazine group (or ring), and a carbodiimide group.

The compound having an epoxy group includes, for example, an alicyclic compound such as vinylcyclohexene dioxide; a glycidyl ester compound such as glycidyl versatate; a glycidyl ether compound such as a hydroquinone diglycidyl ether, a biphenol diglycidyl ether, a bisphenol A diglycidyl ether (bisphenol A-based epoxy resin); a glycidylamine compound; an epoxy group-containing vinyl copolymer; an epoxidized polybutadiene; an epoxidized diene-series monomer-styrene copolymer; a triglycidyl isocyanurate; an epoxy-modified (poly)organosiloxane; and others.

Examples of the compound having an oxetane group include an oxetanyl ester compound such as di[1-ethyl(3-oxetanyl)]methyl isophthalate and di[1-ethyl(3-oxetanyl)]methyl terephthalate, an oxetanyl ether compound {for example, an alkyloxetanyl compound such as di[1-ethyl(3-oxetanyl)]methyl ether and 3-ethyl-3-(2-ethylhexyloxymethyl)oxetane, an aryloxetanyl compound such as 3-ethyl-3-(phenoxymethyl)oxetane, an aralkyloxetanyl ether compound such as 1,4-bis{[(3-ethyl-3-oxetanyl)methoxy]methyl}benzene, a bisphenol-based oxetane resin such as bisphenol-A di[1-ethyl(3-oxetanyl)]methyl ether, a novolak oxetane resin such as a mono- to poly[1-ethyl(3-oxetanyl)]methyl-etherized phenol novolak and a mono- to poly[1-ethyl(3-oxetanyl)]methyl-etherized cresol novolak}, an oxetane-modified (poly)organosiloxane such as 3-ethyl-3-{[3-(triethoxysilyl)propoxy]methyl}oxetane, and a derivative having an alkyloxetanyl unit (e.g., a derivative having an alkyl(3-oxetanyl)methyl unit) corresponding to the derivative having the oxetanyl unit (e.g., the derivative having the [1-ethyl(3-oxetanyl)]methyl unit), and others.

The compound having an acid anhydride group includes, for example, an olefinic resin having a maleic anhydride group (e.g., an ethylene-maleic anhydride copolymer, a maleic anhydride-modified polypropylene), and others.

Examples of the compound having an isocyanate group include an aliphatic isocyanate such as hexamethylene diisocyanate, an alicyclic isocyanate such as isophorone diisocyanate, an aromatic isocyanate such as diphenylmethane isocyanate, a modified product thereof (e.g., a trimer of isophorone diisocyanate), and others.

The compound having an oxazoline group includes, for example, a bisoxazoline compound such as 2,2'-(1,3-phenylene)-bis(2-oxazoline) and 2,2'-(1,4-phenylene)-bis(2-oxazoline), a vinyl-series resin having an oxazoline group (e.g., a vinyl oxazoline-modified styrenic resin), and others.

Examples of the compound having an oxazine group include a bisoxazine compound such as 2,2'-bis(5,6-dihydro-4H-1,3-oxazine), and others.

As the compound having a carbodiimide group, there may be mentioned, for example, a polyarylcarbodiimide such as a poly(phenylcarbodiimide), and a poly(naphthylcarbodiimide); a polyalkylarylcarbodiimide such as a poly(2-methyldiphenylcarbodiimide), a poly(2,6-diethyldiphenylcarbodiimide), a poly(2,6-diisopropyldiphenylcarbodiimide), a poly(2,4,6-triisopropyldiphenylcarbodiimide), and a poly(2,4,6-tri-t-butyldiphenylcarbodiimide); a poly[alkylenebis(alkyl or cycloalkylaryl)carbodiimide] such as a poly[4,4'-methylenebis(2,6-diethylphenyl)carbodiimide], a poly[4,4'-methylenebis(2-ethyl-6-methylphenyl)carbodiimide], a poly[4,4'-methylenebis(2,6-diisopropylphenyl)carbodiimide], and a poly[4,4'-methylenebis(2-ethyl-6-methylcyclohexylphenyl)carbodiimide]; and others.

These reactive stabilizers may be used singly or in combination.

The antioxidant (F) and/or stabilizer (G) may be used singly or in combination. The content of the antioxidant and/or stabilizer may for example be selected within the range of about 0.01 to 5 parts by weight, preferably about 0.05 to 3 parts by weight, and particularly about 0.1 to 2 parts by weight, relative to 100 parts by weight of the flame-retardant resin composition.

Since the flame-retardant resin composition of the present invention comprises the inorganic filler (C), the composition is excellent in dripping inhibition effects. Further, by the addition of the dripping inhibitor (H) such as a fluorine-containing resin, the composition may be improved in inhibition of effects on dripping of kindling material and a molten solution upon combustion.

(H) Fluorine-Containing Resin

As the fluorine-containing resin (or fluorine-series resin) (H), there may be mentioned a homo- or copolymer of a fluorine-containing monomer such as tetrafluoroethylene, chlorotrifluoroethylene, vinylidene fluoride, hexafluoropropylene and perfluoroalkyl vinyl ether; and a copolymer of the fluorine-containing monomer and a copolymerizable monomer such as ethylene, propylene and acrylate. Examples of the fluorine-containing resin are a homopolymer such as a polytetrafluoroethylene, a polychlorotrifluoroethylene and a polyvinylidene fluoride; and a copolymer such as a tetrafluoroethylene-hexafluoropropylene copolymer, a tetrafluoroethylene-perfluoroalkyl vinyl ether copolymer, an ethylene-tetrafluoroethylene copolymer and an ethylene-chlorotrifluoroethylene copolymer. These fluorine-containing resins may be used singly, or used as a mixture of not less than two species thereof.

The fluorine-containing resin (H) may be used in the form of particles, and the mean particle size may for example be about 10 to 5,000 μm, preferably about 100 to 1,000 μm, and more preferably about 100 to 700 μm.

The content of the fluorine-containing resin (H) is, for example, about 0.01 to 10 parts by weight, preferably about 0.1 to 5 parts by weight, and more preferably about 0.1 to 3 parts by weight, relative to 100 parts by weight of the flame-retardant resin composition.

The antioxidant, the stabilizer, and the dripping inhibitor may be used singly or in combination of two or more species. The flame-retardant resin composition of the present invention preferably comprises, in particular, at least one member selected from the hindered phenol-series antioxidant, the phosphorus-containing stabilizer, the inorganic stabilizer, the reactive stabilizer, and the fluorine-containing resin among components mentioned above.

The flame retardant of the present invention imparts high flame retardancy to a resin probably because the flame retardant facilitates carbonization of the resin surface on burning. Moreover, even in the case using a halogen-free flame retardant including the polyphenylene oxide-series resin, the combination use of the phosphoric ester and the polyphosphate of the specific nitrogen-containing cyclic compound effectively realizes high flame retardancy of the base resin (particularly a polyester-series resin) in small amount of the flame retardant, and causes no possibility of bleeding out. In particular, the use of the nitrogen-containing cyclic compound as a flame retardant component considerably improves the flame retardant effects without coloring or staining the resin composition.

Further, the flame-retardant resin composition of the present invention may comprise other additive(s) for any purpose. As other additive(s), there may be mentioned a stabilizer (e.g., an ultraviolet ray absorbing agent, a heat stabilizer, a weather (light)-resistant stabilizer), a lubricant, a mold-release agent (releasing agent), a coloring agent (colorant), a plasticizer,sa nucleating agent, an impact resistance improver (impact modifier), a slip-(friction/wear) improving agent, a filler (e.g., an organic fiber having a high melting point, such an aliphatic or aromatic polyamide, an aromatic polyester, a fluorocarbon resin, and an acrylic resin such as a polyacrylonitrile), and others.

The resin composition of the present invention may be a particulate mixture or a molten mixture, and it may be prepared by mixing the base resin (e.g., a polyester-series resin such as a polyalkylene arylate-series resin) with the flame retardant, the inorganic filler, and if necessary, the additive(s), in a conventional manner.

The resin composition of the present invention may be formed by melting and kneading, and molding with a conventional manner such as extrusion molding, injection molding and compression molding. Thus formed shaped article is excellent in flame retardancy and molding processability (mold-processability), and may be utilized for various purposes. For example, the shaped article is suitable for an electric or electronic device part, an office automation (OA) device part, a household electrical appliance part, a mechanical device part, an automotive part, and others.

INDUSTRIAL APPLICABILITY

According to the present invention, the combination use of a specific flame retardant, with an inorganic filler treated with a novolak epoxy resin inhibits dripping of a flame retardant resin composition and a shaped article thereof. Moreover, the present invention provides a flame-retardant resin composition to which flame retardancy is imparted at a high level by using a halogen-free flame retardant without deteriorating properties of a polyester-series resin, and a shaped article formed with the composition.

EXAMPLES

The following examples are intended to describe this invention in further detail and should by no means be interpreted as defining the scope of the invention. Incidentally, flame retardancy and blooming properties of a resin composition were evaluated on the basis of the following tests.

(Flame Retardancy Test)

In accordance with UL94, the flame retardancy and dripping properties were evaluated using a test piece 0.8 mm thick.

(Evaluation of Blooming Properties)

A test piece 0.8 mm thick for burning was heated at 150° C. for 5 hours, and visually observed for the state of bleeding out in the surface of the test piece. The blooming properties were evaluated on the basis of the following judgmental standard.

"A": no bleeding out was observed
"B": slight bleeding out was observed
"C": remarkable bleeding out was observed

[Base Resin A (Polyester-Series Resin A)]
A-1: Polybutylene terephthalate ["DURANEX", intrinsic viscosity=1.0, manufactured by Polyplastics Co., Ltd.]
A-2: Polyethylene terephthalate ["BELLPET EFG", manufactured by Kanebo Gohsen, Ltd.]

[Flame Retardant B]
[Polyphenylene oxide-series resin, polyphenylene sulfide-series resin B1 (PPO/PPS B1)]
B1-1: Poly(2,6-dimethyl-1,4-phenylene)ether ["PPE polymer YPX-100F", manufactured by Mitsubishi Gas Chemical Co., Inc.]
B1-2: Poly-1,4-phenylene-sulfide

[Phosphoric Ester B2]
B2-1: Resorcinol bis(di-2,6-xylyl phosphate) ["PX200", manufactured by Daihachi Chemical Industry Co., Ltd.]
B2-2: Hydroquinone bis(di-2,6-xylyl phosphate) ["PX201", manufactured by Daihachi Chemical Industry Co., Ltd.]
B2-3: Biphenol bis(di-2,6-xylyl phosphate) ["PX202", manufactured by Daihachi Chemical Industry Co., Ltd.]

B2-4: Bisphenol-A bis(diphenyl phosphate) ["CR-741", manufactured by Daihachi Chemical Industry Co., Ltd.]
B2-5: N,N'-bis(di-2,6-xylyloxyphosphinyl)piperazine [1,4-piperazinediyltetra-2,6-xylyl phosphate]
B2-6: N,N'-bis(diphenoxyphosphinyl)piperazine [1,4-piperazinediyltetraphenyl phosphate]
B2-7: Cyclic phenoxyphosphazene
B2-8: N,N'-bis(neopentylenedioxyphosphinyl)piperazine

[Nitrogen-Containing Cyclic Compound B3]
B3-1: Melamine-melam-melem double salt of polyphosphoric acid ["PMP200", manufactured by Nissan Chemical Industries, Ltd.]
B3-2: Polyphosphoric acid amide ["SUMISAFE PM", manufactured by Sumitomo Chemical Co., Ltd.]
B3-3: Melamine polyphosphate ["Melapur 200", manufactured by DSM]
B3-4: Melamine polymetaphosphate: a compound synthesized according to Example 1 described in Japanese Patent Application Laid-Open No. 81691/1998 (JP-10-81691A)
B3-5: Melamine sulfate ["APINON 901", manufactured by Sanwa Chemical Co., Ltd.]
B3-6: Melamine cyanurate ["MC610", manufactured by Nissan Chemical Industries, Ltd.]

[Inorganic Filler C]
C-1: Glass chopped strand being 10 μm in diameter and 3 mm long, to which 1.2 wt % of a surface-treatment agent containing a novolak epoxy resin as a main component is bonded
C-2: Glass chopped strand being 13 μm in diameter and 3 mm long, to which 1.2 wt % of a surface-treatment agent containing a novolak epoxy resin as a main component is bonded
C-3: Glass chopped strand being 10 μm in diameter and 3 mm long, to which 1.2 wt % of a surface-treatment agent containing a bisphenol A-based epoxy resin as a main component is bonded

[Styrenic Resin D]
D-1: Polystyrene ["TOYO STYROL GP G200C", manufactured by Toyo Styrene Co., Ltd.]
D-2: Acrylonitrile-styrene copolymer ["CEVIAN NJD", manufactured by Daicel Chemical Industries, Ltd.]

[Resinous Flame-Retardant Auxiliary E1]
E1-1: Polycarbonate ["PANLITE L1225", manufactured by Teijin Chemicals Ltd.]
E1-2: Phenoxy resin ["PHENOTOHTO YP-50", manufactured by Tohto Kasei Co., Ltd.]
E1-3: Novolak phenol resin ["SUMILITE RESIN PR-53647", manufactured by Sumitomo Durez Co., Ltd.]
E1-4: Polyarylate ["POLYARYLATE U100", manufactured by Unitika Ltd.]
E1-5: Bisphenol A-based epoxy resin ["EPIKOTE 828", manufactured by Yuka Shell Epoxy K.K.]

[Inorganic Flame-Retardant Auxiliary E2]
E2-1: Red phosphorus ["NOVA EXCEL 140", manufactured by Rinkagaku Kogyo Co., Ltd.]
E2-2: Anhydrous calcium secondary phosphate [mean particle size=about 30 μm, manufactured by Taihei Chemical Industrial Co., Ltd.]
E2-3: Magnesium hydroxide ["KISUMA 5E", manufactured by Kyowa Chemical Industry Co., Ltd.]
E2-4: Zinc borate ["FIREBRAKE ZB", manufactured by Borax Japan Ltd.]
E2-5: Magnesium hydroxide [Ni solid solution, "FINEMAG SN", manufactured by TMG Corp.]

[Antioxidant F]
F-1: Pentaerythritol-tetrakis[3-(3,5-di-t-butyl-4-hydroxyphenyl)propionate] ["IRGANOX 1010", manufactured by Ciba-Geigy Ltd.]

[Stabilizer G]
G-1: Bis-(2,6-di-t-butyl-4-methylphenyl) pentaerythritol diphosphite ["ADK STAB PEP36", manufactured by Adeka Argus Chemical Co., Ltd.]
G-2: Tetrakis(2,4-di-t-butylphenyl)-4,4'-biphenylene diphosphonite ["SANDOSTAB P-EPQ", manufactured by Sandoz.]
G-3: Hydrotalcite ["DHT-4A", manufactured by Kyowa Chemical Industry Co., Ltd.]
G-4: Zeolite ["ZEOLAM A-3", manufactured by Tosoh Corp.]
G-5: Glycidyl versatate
G-6: 1,4-bis{[(3-ethyl-3-oxetanyl)methoxy]methyl}benzene

[Dripping Inhibitor H]
H-1: Polytetrafluoroethylene

Examples 1 to 45 and Comparative Examples 1 to 13

The above components were mixed in the ratio (parts by weight) described in Tables 1 to 4, and the mixture was kneaded and extruded with the use of an extruder to prepare a resin composition. The obtained resin composition was subjected to injection molding to make a shaped article for flame retardancy test. The flame retardancy, dripping properties and blooming properties were evaluated with the use of the test shaped article. The results are shown in Tables 1 to 4.

TABLE 1

| | Examples | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Polyester-series resin A | A-1 | A-1 | A-1 | A-1 | A-1 | A-1 | A-1 | A-1 | A-1 | A-1 | A-1 | A-1 | A-1 | A-1 | A-1 | A-1 | A-1 | A-1 |
| (parts by weight) | 100 | 100 | 100 | 100 | 100 | 100 | 100 | 100 | 100 | 100 | 100 | 100 | 100 | 100 | 100 | 100 | 100 | 100 |
| PPO/PPS B1 | B1-1 | B1-1 | B1-1 | B1-1 | B1-1 | B1-1 | B1-1 | B1-1 | B1-1 | B1-1 | B1-1 | B1-1 | B1-1 | B1-1 | B1-1 | B1-1 | B1-1 | B1-1 |
| (parts by weight) | 30 | 50 | 30 | 30 | 30 | 30 | 30 | 50 | 40 | 40 | 40 | 40 | 40 | 40 | 50 | 40 | 40 | 40 |
| Phosphoric ester B2 | B2-1 | B2-1 | B2-2 | B2-3 | B2-1 | B2-1 | B2-1 | B2-1 | B2-1 | B2-2 | B2-3 | B2-1 | B2-1 | B2-1 | B2-1 | B2-1 | B2-4 | B2-1 |
| (parts by weight) | 40 | 60 | 40 | 40 | 40 | 40 | 40 | 40 | 40 | 40 | 40 | 40 | 40 | 40 | 40 | 40 | 40 | 15 |
| Nitrogen-containing cyclic compound B3 | — | — | — | — | — | — | — | B3-1 | B3-1 | B3-1 | B3-1 | B3-2 | B3-3 | B3-4 | B3-5 | B3-1 | B3-1 | B3-1 |

TABLE 1-continued

| | Examples | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| (parts by weight) | | | | | | | | 15 | 15 | 15 | 15 | 15 | 15 | 15 | 15 | 15 | 15 | 40 |
| Inorganic filler C | C-1 | C-1 | C-1 | C-1 | C-1 | C-1 | C-2 | C-1 | C-1 | C-1 | C-1 | C-1 | C-2 | C-1 | C-1 | C-1 | C-2 | C-1 |
| (parts by weight) | 80 | 100 | 80 | 80 | 80 | 80 | 80 | 90 | 90 | 90 | 90 | 90 | 90 | 90 | 90 | 90 | 90 | 90 |
| Styrenic resin D | D-1 | D-1 | D-1 | D-1 | D-2 | D-1 | D-2 | — | D-1 | D-1 | D-1 | D-1 | D-1 | D-1 | D-1 | D-1 | D-2 | D-1 |
| (parts by weight) | 10 | 15 | 10 | 10 | 10 | 10 | 10 | | 10 | 10 | 10 | 10 | 10 | 10 | 10 | 10 | 10 | 10 |
| Resinous flame-retardant auxiliary E1 | — | — | — | — | — | — | — | — | — | — | — | — | — | — | — | — | — | — |
| (parts by weight) | | | | | | | | | | | | | | | | | | |
| Inorganic flame-retardant auxiliary E2 | — | — | — | — | — | — | — | — | — | — | — | — | — | — | — | — | — | — |
| (parts by weight) | | | | | | | | | | | | | | | | | | |
| Antioxidant F | F-1 | F-1 | F-1 | F-1 | F-1 | F-1 | F-1 | F-1 | F-1 | F-1 | F-1 | F-1 | F-1 | F-1 | F-1 | F-1 | F-1 | F-1 |
| (parts by weight) | 0.8 | 1.0 | 0.8 | 0.8 | 0.8 | 0.8 | 0.8 | 1.0 | 1.0 | 1.0 | 1.0 | 1.0 | 1.0 | 1.0 | 1.0 | 1.0 | 1.0 | 1.0 |
| Stabilizer G | — | — | — | — | — | G-1 | G-2 | G-2 | — | — | — | G-3 | G-2 | G-4 | G-5 | G-1 | G-2 | G-2 |
| (parts by weight) | | | | | | 0.8 | 0.8 | 1.0 | | | | 3.0 | 3.0 | 3.0 | 3.0 | 1.0 | 1.0 | 1.0 |
| Dripping inhibitor H | H-1 | H-1 | H-1 | H-1 | H-1 | H-1 | H-1 | H-1 | H-1 | H-1 | H-1 | H-1 | H-1 | H-1 | H-1 | H-1 | H-1 | H-1 |
| (parts by weight) | 1.3 | 1.5 | 1.3 | 1.3 | 1.3 | 1.3 | 1.3 | 1.5 | 1.5 | 1.5 | 1.5 | 1.5 | 1.5 | 1.5 | 1.5 | 1.5 | 1.5 | 1.5 |
| UL94 Flame Retardancy | V-1 | V-0 | V-1 | V-1 | V-1 | V-1 | V-1 | V-0 | V-0 | V-0 | V-0 | V-0 | V-0 | V-0 | V-0 | V-0 | V-0 | V-0 |
| Dripping properties | no | no | no | no | no | no | no | no | no | no | no | no | no | no | no | no | no | no |
| Blooming properties | A | A | A | A | B | A | A | A | A | A | A | A | A | A | A | A | A | A |

TABLE 2

| | Examples | | | | | | | | | | | | | |
|---|---|---|---|---|---|---|---|---|---|---|---|---|---|---|
| | 19 | 20 | 21 | 22 | 23 | 24 | 25 | 26 | 27 | 28 | 29 | 30 | 31 | 32 |
| Polyester-series resin A | A-1 | A-1 | A-1 | A-1 | A-1 | A-1 | A-1 | A-1 | A-1 | A-1 | A-1 | A-1 | A-1 | A-1 |
| (parts by weight) | 100 | 100 | 100 | 100 | 100 | 100 | 100 | 100 | 100 | 100 | 100 | 100 | 100 | 100 |
| PPO/PPS B1 | B1-1 | B1-1 | B1-1 | B1-1 | B1-1 | B1-1 | B1-1 | B1-1 | B1-1 | B1-1 | B1-1 | B1-1 | B1-1 | B1-1 |
| (parts by weight) | 50 | 50 | 50 | 40 | 40 | 40 | 40 | 40 | 40 | 40 | 40 | 40 | 40 | 40 |
| Phosphoric ester B2 | B2-1 | B2-1 | B2-1 | B2-1 | B2-1 | B2-1 | B2-1 | B2-1 | B2-1 | B2-1 | B2-1 | B2-1 | B2-1 | B2-1 |
| (parts by weight) | 60 | 60 | 60 | 40 | 40 | 40 | 40 | 40 | 40 | 40 | 40 | 40 | 40 | 40 |
| Nitrogen-containing cyclic compound B3 | — | — | — | — | — | B3-1 | B3-1 | B3-1 | B3-1 | B3-1 | B3-1 | B3-6 | B3-1 | B3-6 | B3-1 |
| (parts by weight) | | | | | | 15 | 15 | 15 | 10 | 15 | 10 | 5 | 5 | 5 | 5 |
| Inorganic filler C | C-1 | C-1 | C-2 | C-1 | C-1 | C-1 | C-1 | C-1 | C-1 | C-1 | C-1 | C-1 | C-1 | C-1 |
| (parts by weight) | 100 | 100 | 100 | 80 | 90 | 90 | 90 | 90 | 90 | 90 | 90 | 90 | 90 | 90 |
| Styrenic resin D | D-1 | D-1 | D-1 | D-1 | D-1 | D-1 | D-1 | D-1 | D-1 | D-1 | D-1 | D-1 | D-1 | D-1 |
| (parts by weight) | 15 | 15 | 15 | 10 | 10 | 10 | 10 | 10 | 10 | 10 | 10 | 10 | 10 | 10 |
| Resinous flame-retardant auxiliary E1 (parts by weight) | E1-1 3 | E1-2 3 | E1-1 3 | E1-2 3 | E1-3 3 | — | E1-1 3 | E1-2 3 | E1-1 3 | E1-2 3 | E1-3 3 | E1-4 3 | — | — | — |
| Inorganic flame-retardant auxiliary E2 (parts by weight) | E2-1 3 | E2-1 3 | — | — | E2-2 15 | — | E2-3 3 | — | — | — | — | E2-2 5 | E2-2 5 | E2-4 5 |
| Antioxidant F | F-1 | F-1 | F-1 | F-1 | F-1 | F-1 | F-1 | F-1 | F-1 | F-1 | F-1 | F-1 | F-1 | F-1 |
| (parts by weight) | 1.0 | 1.0 | 0.8 | 0.8 | 1.0 | 1.0 | 1.0 | 1.0 | 1.0 | 1.0 | 1.0 | 1.0 | 1.0 | 1.0 |
| Stabilizer G | G-1 | — | G-1 | — | — | G-1 | — | G-1 | — | G-2 | — | — | — | — |
| (parts by weight) | 1.0 | | 1.0 | | | 1.0 | | 1.0 | | 1.0 | | | | |
| Dripping inhibitor H | H-1 | H-1 | H-1 | H-1 | H-1 | H-1 | H-1 | H-1 | — | H-1 | H-1 | H-1 | H-1 | H-1 |
| (parts by weight) | 1.5 | 1.5 | 1.5 | 1.3 | 1.5 | 1.5 | 1.5 | 1.5 | | 1.5 | 1.5 | 1.5 | 1.5 | 1.5 |
| UL94 Flame Retardancy | V-0 | V-0 | V-0 | V-0 | V-0 | V-0 | V-0 | V-0 | V-0 | V-0 | V-0 | V-0 | V-0 | V-0 |
| Dripping properties | no | no | no | no | no | no | no | no | no | no | no | no | no | no |
| Blooming properties | A | A | A | A | A | A | A | A | A | A | A | A | A | A |

TABLE 3

| | Examples | | | | | | | | | | | | |
|---|---|---|---|---|---|---|---|---|---|---|---|---|---|
| | 33 | 34 | 35 | 36 | 37 | 38 | 39 | 40 | 41 | 42 | 43 | 44 | 45 |
| Polyester-series resin A | A-2 | A-2 | A-1 | A-1 | A-1 | A-1 | A-1 | A-1 | A-1 | A-1 A-2 | A-1 A-2 | A-1 A-2 | A-1 A-2 |
| (parts by weight) | 100 | 100 | 100 | 100 | 100 | 100 | 100 | 100 | 100 | 70 30 | 50 50 | 50 50 | 50 50 |

TABLE 3-continued

|  | Examples | | | | | | | | | | | | |
| --- | --- | --- | --- | --- | --- | --- | --- | --- | --- | --- | --- | --- | --- |
|  | 33 | 34 | 35 | 36 | 37 | 38 | 39 | 40 | 41 | 42 | 43 | 44 | 45 |
| PPO/PPS B1 | B1-1 | B1-1 | B1-1 B1-2 | B1-1 B1-2 | B1-1 | B1-1 | B1-1 | B1-1 | B1-1 | B1-1 | B1-1 | B1-1 | B1-1 |
| (parts by weight) | 30 | 20 | 35 15 | 30 10 | 40 | 40 | 40 | 40 | 40 | 30 | 5 | 5 | 5 |
| Phosphoric ester B2 | B2-1 | B2-1 | B2-1 | B2-1 | B2-5 | B2-6 | B2-7 | B2-7 | B2-8 | B2-4 | B2-1 | B2-6 | B2-7 |
| (parts by weight) | 40 | 25 | 40 | 40 | 40 | 40 | 40 | 40 | 40 | 30 | 40 | 40 | 40 |
| Nitrogen-containing | — | B3-1 | B3-1 | B3-1 | B3-1 | B3-6 | B3-1 | B3-6 | B3-1 | B3-1 | B3-1 B3-6 | B3-6 | B3-1 B3-6 |
| cyclic compound B3 |  | 12 | 15 | 15 | 15 | 15 | 15 | 15 | 15 | 10 | 15 50 | 65 | 15 50 |
| (parts by weight) |  |  |  |  |  |  |  |  |  |  |  |  |  |
| Inorganic filler C | C-1 | C-1 | C-1 | C-1 | C-1 | C-1 | C-1 | C-1 | C-1 | C-1 | C-1 | C-1 | C-1 |
| (parts by weight) | 80 | 70 | 90 | 90 | 90 | 90 | 90 | 90 | 90 | 80 | 100 | 100 | 100 |
| Styrenic resin D | D-1 | D-1 | — | D-1 | D-1 | D-1 | D-1 | D-1 | D-1 | D-1 | D-2 | D-2 | D-2 |
| (parts by weight) | 10 | 8 |  | 10 | 10 | 10 | 10 | 10 | 10 | 10 | 15 | 15 | 15 |
| Resinous flame-retardant | — | — | — | — | — | E1-5 | — | E1-1 | E1-1 | E1-5 | E1-5 | E1-5 | E1-5 |
| auxiliary E1 (parts by |  |  |  |  | 3 | 3 | 3 | 3 | 3 |  | 3 |  | 3 |
| weight) |  |  |  |  |  |  |  |  |  |  |  |  |  |
| Inorganic flame-retardant | — | — | — | — | — | — | — | — | — | — | — | — | — |
| auxiliary E2 (parts by |  |  |  |  |  |  |  |  |  |  |  |  |  |
| weight) |  |  |  |  |  |  |  |  |  |  |  |  |  |
| Antioxidant F | F-1 | F-1 | F-1 | F-1 | F-1 | F-1 | F-1 | F-1 | F-1 | F-1 | F-1 | F-1 | F-1 |
| (parts by weight) | 0.8 | 0.8 | 1.0 | 1.0 | 1.0 | 1.0 | 1.0 | 1.0 | 1.0 | 1.0 | 1.0 | 1.0 | 1.0 |
| Stabilizer G | — | — | — | — | — | G-3 | — | — | — | G-2 | G-2 G-6 | G-2 | G-2 |
| (parts by weight) |  |  |  |  |  | 3.0 |  |  |  | 1.0 | 1.0 3.0 | 1.0 | 1.0 |
| Dripping inhibitor H | H-1 | H-1 | H-1 | H-1 | H-1 | H-1 | H-1 | H-1 | H-1 | H-1 | H-1 | H-1 | H-1 |
| (parts by weight) | 1.3 | 1.3 | 1.5 | 1.5 | 1.5 | 1.5 | 1.5 | 1.5 | 1.5 | 1.5 | 1.5 | 1.5 | 1.5 |
| UL94 Flame | V-0 | V-0 | V-0 | V-0 | V-0 | V-0 | V-0 | V-0 | V-0 | V-0 | V-0 | V-0 | V-0 |
| Retardancy |  |  |  |  |  |  |  |  |  |  |  |  |  |
| Dripping properties | no | no | no | no | no | no | no | no | no | no | no | no | no |
| Blooming properties | A | A | A | A | A | A | A | A | A | A | A | A | A |

TABLE 4

|  | Comparative Examples | | | | | | | | | | | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 |
| Polyester-series resin A | A-1 | A-1 | A-1 | A-1 | A-1 | A-1 | A-1 | A-1 | A-2 | A-1 | A-1 | A-1 | A-1 |
| (parts by weight) | 100 | 100 | 100 | 100 | 100 | 100 | 100 | 100 | 100 | 100 | 100 | 100 | 100 |
| PPO/PPS B1 | B1-1 | — | B1-1 | — | B1-1 | — | B1-1 | B1-1 | B1-1 | B1-1 | B1-1 | B1-1 | B1-1 |
| (parts by weight) | 30 |  | 30 |  | 30 |  | 40 | 40 | 20 | 40 | 40 | 40 |  |
| Phosphoric ester B2 | — | B2-1 | — | B2-1 | — | B2-1 | B2-1 | B2-1 | B2-1 | B2-1 | B2-5 | B2-6 | B2-7 |
| (parts by weight) |  | 40 |  | 40 |  | 40 | 40 | 40 | 25 | 40 | 40 | 40 | 40 |
| Nitrogen-containing | — | — | — | — | — | — | — | B3-6 | B3-5 | B3-6 | B3-6 | B3-6 | 83-6 |
| cyclic compound B3 |  |  |  |  |  |  |  | 15 | 15 | 12 | 15 | 15 | 15 |
| (parts by weight) |  |  |  |  |  |  |  |  |  |  |  |  |  |
| Inorganic filler C | C-1 | C-1 | C-2 | C-2 | C-3 | C-3 | C-3 | C-3 | C-3 | C-3 | C-3 | C-3 | C-3 |
| (parts by weight) | 80 | 80 | 80 | 80 | 80 | 80 | 80 | 90 | 90 | 70 | 90 | 90 | 90 |
| Styrenic resin D | D-1 | D-1 | D-1 | D-1 | D-1 | D-1 | D-1 | — | D-1 | — | — | — | — |
| (parts by weight) | 10 | 10 | 10 | 10 | 10 | 10 | 10 |  | 10 |  |  |  |  |
| Resinous flame-retardant |  |  |  |  |  |  |  |  |  |  |  |  |  |
| auxiliary E1 (parts by weight) |  |  |  |  |  |  |  |  |  |  |  |  |  |
| Inorganic flame-retardant |  |  |  |  |  |  |  |  |  |  |  |  |  |
| auxiliary E2 (parts by weight) |  |  |  |  |  |  |  |  |  |  |  |  |  |
| Antioxidant F | F-1 | F-1 | F-1 | F-1 | F-1 | F-1 | F-1 | F-1 | F-1 | F-1 | F-1 | F-1 | F-1 |
| (parts by weight) | 0.8 | 0.8 | 0.8 | 0.8 | 0.8 | 0.8 | 0.8 | 1.0 | 1.0 | 0.8 | 1.0 | 1.0 | 1.0 |
| Stabilizer G |  |  |  |  |  |  |  |  |  |  |  |  |  |
| (parts by weight) |  |  |  |  |  |  |  |  |  |  |  |  |  |
| Dripping inhibitor H | H-1 | H-1 | H-1 | H-1 | H-1 | H-1 | H-1 | H-1 | H-1 | H-1 | H-1 | H-1 | H-1 |
| (parts by weight) | 1.3 | 1.3 | 1.3 | 1.3 | 1.3 | 1.3 | 1.3 | 1.5 | 1.5 | 1.3 | 1.5 | 1.5 | 1.5 |
| U194 Flame Retardancy | HB | HB | HB | HB | HB | HB | V-2 | V-1 | V-1 | V-1 | V-1 | V-1 | V-1 |
| Dripping properties | yes | yes | yes | yes | yes | yes | yes | yes | yes | yes | yes | yes | yes |
| Blooming properties | A | C | A | C | A | C | A | A | A | A | A | A | A |

The invention claimed is:

1. A flame-retardant resin composition, which comprises a base resin (A), a flame retardant (B), an inorganic filler (C), and a styrenic resin (D), wherein the flame retardant comprises:
   (B1) at least one member selected from the group consisting of a polyphenylene oxide-series resin and a polyphenylene sulfide-series resin,
   (B2) a phosphoric ester, and
   (B3) a nitrogen-containing compound, and wherein the base resin (A) comprises a polyester-series resin, the nitrogen-containing compound (B3) is a salt of a nitrogen-containing cyclic compound having an amino group with an oxygen acid, an organic phosphoric acid, or an organic sulfonic acid, and
   the inorganic filler (C) has been treated with a surface-treatment agent or sizing agent containing a novolak epoxy resin as a main component.

2. A flame-retardant resin composition according to claim 1, wherein the inorganic filler (C) comprises at least one member selected from the group consisting of a glass fiber and a glass flake.

3. A flame-retardant resin composition according to claim 1, wherein the amount of the surface-treatment agent or sizing agent is 0.01 to 5 parts by weight relative to 100 parts by weight of the inorganic filler.

4. A flame-retardant resin composition according to claim 1, wherein the styrenic resin (D) comprises at least one member selected from the group consisting of polystyrene, styrene-methylmethacrylate copolymer, styrene-(meth)acrylic acid copolymer, styrene-maleic anhydride copolymer, styrene-acrylonitrile copolymer, high impact polystyrene, ABS resin, AAS resin, ACS resin, a polymer which is obtained by graft polymerization of styrene and acrylonitrile to an ethylene-vinyl acetate copolymer, a polymer which is obtained by graft polymerization of styrene and acrylonitrile to an ethylene-propylene rubber, MBS resin, a resin which is obtained by graft polymerization of styrene and acrylonitrile to a styrene-butadiene copolymer rubber, styrene-butadiene-styrene block copolymer, styrene-isoprene block copolymer, styrene-isoprene-styrene block copolymer, hydrogenated styrene-butadiene-styrene block copolymer and hydrogenated styrene-isoprene-styrene block copolymer.

5. A flame-retardant resin composition according to claim 1, wherein the base resin (A) comprises a homo- or co-polyester having at least one unit selected from the group consisting of 1,4-cyclohexanedimethylene terephthalate, a $C_{2-4}$ alkylene terephthalate, and a $C_{2-4}$ alkylene naphthalate.

6. A flame-retardant resin composition according to claim 1, wherein the proportions of the flame retardant (B) and the inorganic filler (C) are 10 to 300 parts by weight and 1 to 200 parts by weight, respectively, relative to 100 parts by weight of the base resin (A).

7. A flame-retardant resin composition according to claim 1, wherein the flame retardant (B) comprises 10 to 500 parts by weight of the component (B1) and 12.5 to 1000 parts by weight of the nitrogen-containing compound (B3), relative to 100 parts by weight of the phosphoric ester (B2).

8. A flame-retardant resin composition, which comprises:
   at least one base resin (A) selected from the group consisting of a polybutylene terephthalate, a copolyester containing a butylene terephthalate as a main unit thereof, a polyethylene terephthalate, and a copolyester containing an ethylene terephthalate as a main unit thereof,
   a flame retardant (B),
   a glass fiber (C); and
   a styrenic resin (D); wherein
   the flame retardant (B) comprises the following components (B1), (B2) and (B3):
   (B1) at least one member selected from the group consisting of a polyphenylene oxide-series resin and a polyphenylene sulfide-series resin,
   (B2) a condensed phosphoric ester and
   (B3) a nitrogen-containing compound; and wherein the nitrogen-containing compound (B3) is a salt of a nitrogen-containing cyclic compound having an amino group with an oxygen acid, an organic phosphoric acid, or an organic sulfonic acid, and
   the surface of the glass fiber (C) has been treated with 0.05 to 3 parts by weight of a surface-treatment agent or sizing agent containing a novolak epoxy resin as a main component relative to 100 parts by weight of the glass fiber.

9. A flame-retardant resin composition according to claim 1, which further comprises at least one flame-retardant auxiliary selected from the group consisting of a resinous flame-retardant auxiliary (E1), and an inorganic flame-retardant auxiliary (E2).

10. A flame-retardant resin composition according to claim 9, wherein
    the resinous flame-retardant auxiliary (E1) comprises at least one aromatic resin selected from the group consisting of a resin of which the main chain or side chain contains an aromatic ring having at least one group selected from the group consisting of a hydroxyl group and an amino group, a polyarylate-series resin, an aromatic epoxy resin, and a polycarbonate-series resin; and
    the inorganic flame-retardant auxiliary (E2) comprises at least one member selected from the group consisting of a metal borate, a metal hydrogenphosphate, a metal oxide, a metal hydroxide, a metal sulfide, and a red phosphorus.

11. A flame-retardant resin composition according to claim 1, which further comprises at least one additive selected from the group consisting of a fluorine-containing resin, a hindered phenol-series antioxidant, a phosphorus-containing stabilizer, an inorganic stabilizer, and a compound having a functional group reactive to an active hydrogen atom.

12. A shaped article formed with a flame-retardant resin composition recited in claim 1.

13. A shaped article according to claim 12, which is an electric or electronic device part, an office automation device part, a household electrical appliance part, an automotive part, or a mechanical part or machine element.

14. A flame-retardant resin composition according to claim 1, wherein the phosphoric ester (B2) comprises a condensed phosphoric ester, and the nitrogen-containing cyclic compound (B3) comprises a polyphosphate of an amino group-containing triazine compound.

15. A flame-retardant resin composition according to claim 8, wherein the flame retardant (B) comprises the following components (B1), (B2), and (B3):
    (B1) at least one member selected from the group consisting of a polyphenylene oxide-series resin and a polyphenylene sulfide-series resin,
    (B2) a condensed phosphoric ester, and
    (B3) a salt of a polyphosphoric acid having a condensation degree of 3 to 200 with at least one member selected from the group consisting of melamine and a melamine condensate.

* * * * *